US012750376B1

(12) United States Patent
Bolignano et al.

(10) Patent No.: US 12,750,376 B1
(45) Date of Patent: Sep. 29, 2026

(54) TECHNIQUES FOR ANALYZING SECURITY IN COMPUTING ENVIRONMENTS WITH PRIVILEGE ESCALATION

(71) Applicant: Amazon Technologies, Inc., Seattle, WA (US)

(72) Inventors: Pauline Virginie Bolignano, London (GB); John Byron Cook, Brooklyn, NY (US); Andrew Jude Gacek, Maple Grove, MN (US); Kasper Luckow, Sunnyvale, CA (US); Neha Rungta, San Jose, CA (US); Cole Schlesinger, Mountain View, CA (US); Ian Sweet, College Park, MD (US); Carsten Varming, Brooklyn, NY (US)

(73) Assignee: Amazon Technologies, Inc., Seattle, WA (US)

( * ) Notice: Subject to any disclaimer, the term of this patent is extended or adjusted under 35 U.S.C. 154(b) by 480 days.

(21) Appl. No.: 17/971,425

(22) Filed: Oct. 21, 2022

Related U.S. Application Data

(63) Continuation of application No. 16/206,859, filed on Nov. 30, 2018, now Pat. No. 11,483,317.

(51) Int. Cl.

| | |
|---|---|
| ***H04L 9/40*** | (2022.01) |
| ***G06F 9/54*** | (2006.01) |
| ***G06F 16/901*** | (2019.01) |

(52) U.S. Cl.
CPC ............ *H04L 63/105* (2013.01); *G06F 9/547* (2013.01); *G06F 16/9024* (2019.01); *H04L 63/20* (2013.01)

(58) Field of Classification Search
CPC ... H04L 63/105; H04L 63/20; G06F 16/9024; G06F 9/547
See application file for complete search history.

(56) References Cited

U.S. PATENT DOCUMENTS

| | | | |
|---|---|---|---|
| 5,469,367 | A | 11/1995 | Puri et al. |
| 6,125,447 | A | 9/2000 | Gong |
| 9,325,739 | B1 | 4/2016 | Roth et al. |

(Continued)

FOREIGN PATENT DOCUMENTS

| | | | |
|---|---|---|---|
| CN | 101816006 | A | 8/2010 |
| CN | 101911652 | A | 12/2010 |

(Continued)

OTHER PUBLICATIONS

AWS Identity and Access Management User Guide, Oct. 17, 2012, but no later than Aug. 2, 2017, 1679 pages (Year: 2017).*

(Continued)

*Primary Examiner* — Oleg Korsak
(74) *Attorney, Agent, or Firm* — Davis Wright Tremaine LLP

(57) ABSTRACT

A policy auditing service can be implemented, in accordance with at least one embodiment that obtains a set of parameters that indicates a snapshot of a policy configuration for an account, a query, and a security policy. The security policy may encode a security requirement or invariant. The policy auditing system may determine states that can be reached via mutative operations (e.g., role assumption) and use a policy analyzer service to determine whether assuming a role results in a grant of access that is at least as permissive as the security policy of the set of parameters.

20 Claims, 20 Drawing Sheets

(56) References Cited

U.S. PATENT DOCUMENTS

| | | | |
|---|---|---|---|
| 10,630,695 B2 | 4/2020 | Cook et al. | |
| 10,757,128 B2 | 8/2020 | Cook et al. | |
| 10,958,662 B1 * | 3/2021 | Sole | H04L 63/0853 |
| 11,134,058 B1 * | 9/2021 | Sole | H04W 12/12 |
| 11,483,317 B1 | 10/2022 | Bolignano et al. | |
| 11,675,929 B2 * | 6/2023 | Brannon | G06Q 20/102 726/30 |
| 2004/0123145 A1 | 6/2004 | Baffes et al. | |
| 2006/0230432 A1 | 10/2006 | Lee et al. | |
| 2007/0156691 A1 | 7/2007 | Sturms et al. | |
| 2008/0046960 A1 | 2/2008 | Bade et al. | |
| 2008/0256357 A1 * | 10/2008 | Iyengar | G06F 21/31 713/155 |
| 2009/0070853 A1 | 3/2009 | Chung et al. | |
| 2010/0037290 A1 | 2/2010 | Griffin et al. | |
| 2010/0064341 A1 | 3/2010 | Aldera | |
| 2012/0017260 A1 | 1/2012 | Narain et al. | |
| 2013/0086184 A1 | 4/2013 | Kavantzas et al. | |
| 2013/0312058 A1 | 11/2013 | Thompson et al. | |
| 2014/0013400 A1 | 1/2014 | Warshavsky et al. | |
| 2014/0359695 A1 | 12/2014 | Chari et al. | |
| 2015/0082370 A1 | 3/2015 | Jayaraman et al. | |
| 2015/0082441 A1 | 3/2015 | Gathala et al. | |
| 2016/0212167 A1 | 7/2016 | Dotan et al. | |
| 2016/0239677 A1 | 8/2016 | Roth et al. | |

FOREIGN PATENT DOCUMENTS

| | | |
|---|---|---|
| CN | 105471618 A | 4/2016 |
| JP | 2003186831 | 7/2003 |
| JP | 2009157453 A | 7/2009 |
| JP | 2015032159 | 2/2015 |
| JP | 2016129073 A | 7/2016 |
| JP | 2016519809 A | 7/2016 |
| JP | 2016218611 A | 12/2016 |
| JP | 2020525898 A | 8/2020 |
| WO | 2016129073 | 8/2016 |

OTHER PUBLICATIONS

AWS Identity and Access Management: User Guide (Nov. 22, 2017, 683 pages) (Year: 2017).*

Japanese Decision To Grant Patent Application No. 2021-149338 delivered Jan. 4, 2023, 2 pages.

European Patent Office Extended Search Report; Patent Application No. 23150888.8 dated Mar. 10, 2023, 9 pages.

Hughes, et al., "Automated Verification of Access Control Policies Using a SAT Solver." International Journal on Software Tools for Technology Transfer, Springer, vol. 10, No. 6, Oct. 21, 2008, 18 pages.

Japanese Decision To Grant Patent Application No. 2023-029045 delivered May 9, 2023, 1 page.

Kolovski, et al., "Analyzing Web Access Control Policies," 16th International World Wide Web Conference, May 8, 2007, 10 pages.

Barrett et al., "The SMT-LIB Standard Version 2.0," Dec. 21, 2010, retrieved Jun. 17, 2019, from http://smtlib.cs.uiowa.edu/papers/smt-lib-reference-v2.0-r10.12.21.pdf, 85 pages.

Barrett et al., "The SMT-LIB Standard Version 2.5," Jun. 28, 2015, retrieved Jun. 17, 2019, from http://smtlib.cs.uiowa.edu/papers/smt-lib-reference-v2.5-r2015-06-28.pdf, 85 pages.

Barrett, "SMT Solvers: Theory and Practice, Section 4.3," Sep. 17, 2008, retrieved from https://resources.mpi-inf.mpg.de/ departments/rg1/conferences/vtsa08/slides/barret2_smt.pdf, 236 pages.

Chinese First Office Action for Patent Application No. 201880043730.6 dated Aug. 31, 2020, 5 pages.

Chinese First Office Action for Patent Application No. 20188043935.4 dated Jan. 15, 2021, 12 pages.

Chinese Intention to Grant for Patent Application No. 201880043935.4 dated Jul. 20, 2021, 4 pages.

European Communication pursuant to Article 94(3) EPC for Patent Application No. 18738146.2 dated Mar. 15, 2021, 4 pages.

Gao, "Conflict Handling In Policy-Based Security Management," University of Florida Department of Computer and Information Science and Engineering, Masters Thesis, May 2002, 57 pages.

Graham et al., "Automated verification of access control policies using a SAT solver," published Oct. 21, 2008, Springer-Verlag 2008, 18 pages.

Halpern et al., "Using First-Order Logic to Reason about Policies," ACM Transactions on Information and System Security (TISSEC) 11(4):21, Jul. 2008, 15 pages.

Hughes et al., "Automated verification of access control policies using a SAT solver," International Journal on Software Tools for Technology Transfer, Oct. 21, 2008, 10(6): 503-520.

International Search Report and Written Opinion mailed Aug. 23, 2018, International Patent Application No. PCT/US2018/037947, filed Jun. 15, 2018.

International Search Report and Written Opinion mailed Aug. 28, 2018, International Patent Application No. PCT/US2018/037948, filed Jun. 15, 2018.

Japanese Non Final Notice of Final Rejection for Patent Application No. 2019-569760 dated Apr. 6, 2021, 10 pages.

Japanese Non Final Notice of Final Rejection for Patent Application No. 2021-149338 dated Sep. 6, 2022, 4 pages.

Japanese Notice of Reasons for Refusal of Patent Application No. 2021-149338 dated Sep. 2, 2022, 7 pages.

Koloviski et al., "Analyzing Web Access Control Policies," 16th International World Wide Web Conference, 2007, 10 pages.

Kolovski et al., "Analyzing Web Access Control Policies," 16th International World Wide Web Confrence, Association for Computing Machinery U.S., May 8-12, 2007, pp. 677-686.

Korean Notice of Allowance for Patent Application No. 10-2020-7000122 dated Jun. 2, 2021, 4 pages.

Korean Notification of Reason for Refusal for Patent Application No. 10-2020-7000122 dated Dec. 22, 2020, 6 pages.

Lupu et al., "Conflicts in Policy-Based Distributed Systems Management," IEEE Transactions on Software Engineering, 25(6):852-869, Nov. 1999.

Pretschner et al., "Model-Based Tests for Access Control Policies," 2008 International Conference on Software Testing, Verification, and Validation, IEEE, Apr. 9, 2008, pp. 338-347.

Ranise et al., "The SMT-LIB Standard: Version 1.0 Working Draft," Jul. 26, 2004, retrieved Jun. 17, 2019, from http://smtlib.cs.uiowa.edu/papers/format-v1.0-r04.07.26.pdf, 33 pages.

Ranise et al., "The SMT-LIB Standard: Version 1.2," Aug. 5, 2006, retrieved Jun. 17, 2019, from http://smtlib.cs.uiowa.edu/papers/format-v1.2-r06.08.05.pdf, 43 pages.

Turkmen, "Analysis of XACML Policies with SMT," International Conference on Principles of Security and Trust, POST 2015: Principles of Security and Trust, Apr. 11, 2015, retrieved from https://link.springer.com/chapter/10.1007/978-3-662-46666-7_7, 22 pages.

Wikipedia, "Satisfiability modulo theories," May 27, 2016, retrieved Feb. 12, 2019, from https://en.wikipedia.org/w/index.php?title=Satisfiability_modulo_theories&oldid=722386638, 9 pages.

Chinese First Office Action for Patent Application No. 202111162818.X dated Oct. 14, 2023, 9 pages.

European Patent Office Communication pursuant to Article 94(3) EPC dated Apr. 2, 2025, Application No. 23150888.8, 4 pages.

* cited by examiner

TECHNIQUES FOR ANALYZING SECURITY IN COMPUTING ENVIRONMENTS WITH PRIVILEGE ESCALATION

CROSS-REFERENCE TO RELATED APPLICATIONS

This application is a continuation of U.S. patent application Ser. No. 16/206,859, filed Nov. 30, 2018, entitled "TECHNIQUES FOR ANALYZING SECURITY IN COMPUTING ENVIRONMENTS WITH PRIVILEGE ESCALATION," the content of which is incorporated by reference herein in its entirety.

BACKGROUND

The security of computing resources and associated data is of high importance in many contexts. As an example, networks of computing devices may be utilized to provide a robust set of services to their users. Within a network, a first user may be privileged with certain access rights and a second user may have a second set of access rights which may be different from the first user's access rights. Access rights of users in the context of a computing resource service provider may be defined using security policies, which may be utilized by the service provider as part of determining whether to grant or deny a user access to a computing resource.

Managing and maintaining the security of computer systems and computer networks is often complex and challenging. In many cases, the access rights of users in a system may change over time, which may, in some cases, necessitate a change in the security policies that apply to a user. As the number and types of users that are supported in a computer system or computer network expands, it may become difficult to determine whether the access rights associated with a user actually grants access to resources for which a user should have access to and denies access to resources for which a user should not have access to.

In many computer systems, privilege escalation presents additional challenges. Privilege escalation may refer to the ability of a principal (e.g., a user) to gain additional permissions that enable access to additional computing resources. Thus, there are challenges in determining whether a particular user has access to a particular computing resource, at least because in some cases, a user may have access to computing resources that are not directly allowed under the user's permissions (e.g., accessible via privilege escalation).

BRIEF DESCRIPTION OF THE DRAWINGS

Various techniques will be described with reference to the drawings, in which.

DETAILED DESCRIPTION

Figure 1:
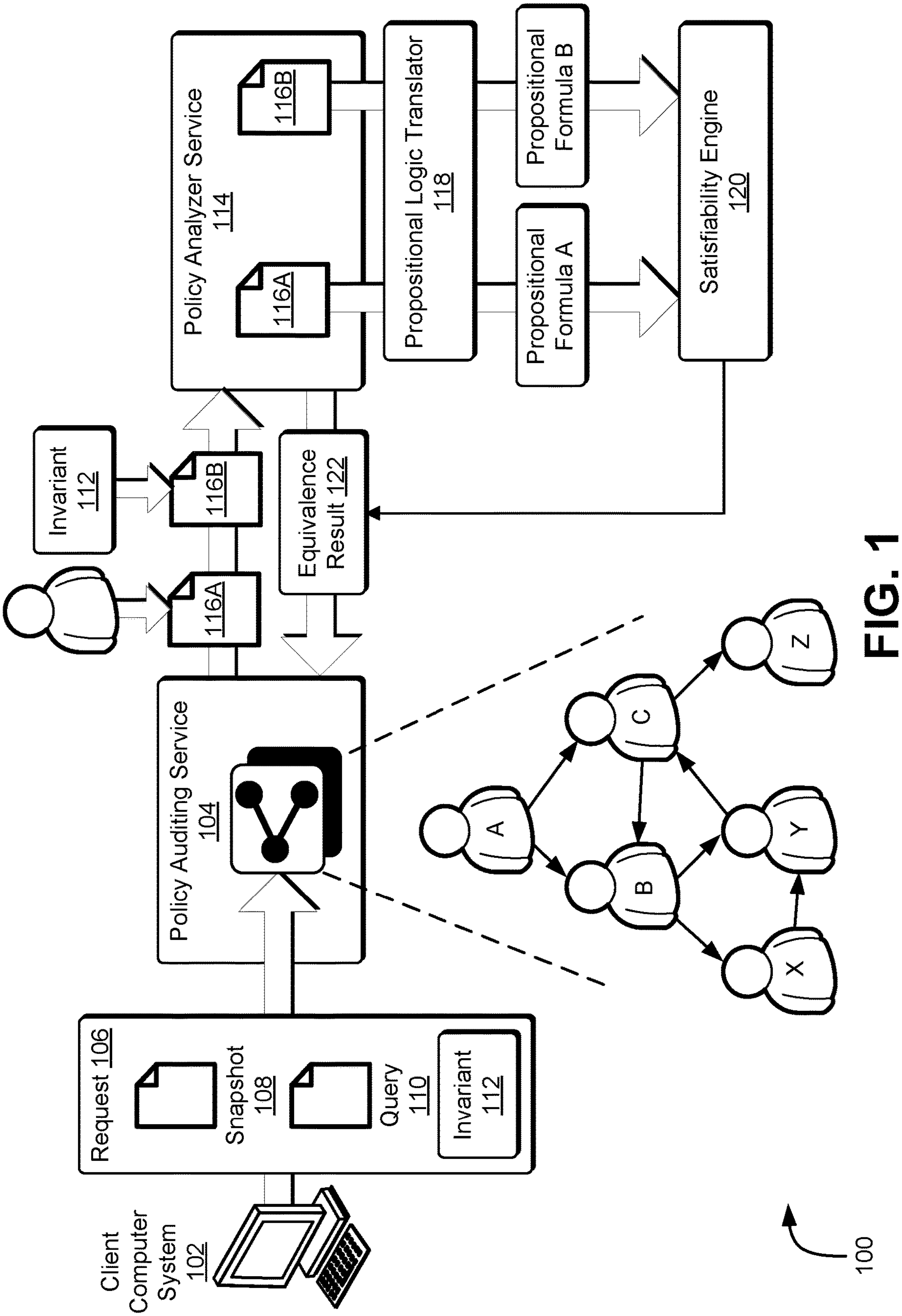
FIG. 1 illustrates an environment in which various embodiments can be implemented.

In various computing environments, computer systems such as service providers may be configured to support multiple principals (e.g., users) that can have different permissions or rights for accessing computing resources. Security policies may be utilized to define how and/or in what manner computing resources may be accessed, rights of a user within the system, and so on. Providing different permissions to different users may be a security feature of a computer system that allows for fine-grained access controls.

Techniques for invariant model analysis and configuration validation may be described herein that can be utilized by computing resource service providers. The invariant model analysis tool can be used to check that all reachable policy management states satisfy an invariant. An policy management state may refer to a complete description of the authentication and authorization specifications for a group of accounts and services. For example, a user may submit a request to verify that none of the user's compute instances may reach an policy management state which grants them administrative privileges. A policy auditing service may utilize a SMT-based policy comparison tool implemented as a policy analyzer service to construct a model (e.g., state-transition system) and check that states satisfy the provided invariant. If the policy auditing service determines that an invariant does not hold, it may produce a counter-example in the form of a sequence of application programming interface (API) calls that demonstrates a scenario in which the invariant does not hold. If the invariant constitutes a security requirement, then the counter-example represents an exploit which violates the security requirement. Accordingly, techniques described herein can be utilized to improve the security of computer systems by determining whether certain invariants (e.g., security requirements) are satisfied and can be used to produce counter-examples in which the invariants do not hold. In this way, security exploits or vulnerabilities of a computing environment can be rigorously identified and systematically eliminated.

Various types of computing environments, such as computing resource service providers, support multiple concurrent users. A computing resource service provider may support multiple clients that connect to the service over a network such as the Internet; customers of the computing resource service provider may utilize a client computing device to access computing resources of the computing resource service provider. A customer of the computing resources service provider may be associated with a user account that is authenticated and authorized as part of providing access to computing resources.

A role may be an identity within a computing environment with permission policies that may be used to determine a set of capabilities that the role is capable of performing within the context of the computing environment. The permissions may include rights to access data resources (e.g., rights to create, read, update, and delete a file) as well as access to services (e.g., rights to make an API request and have the request fulfilled by a service) as well as other rights (e.g., administrative rights in a computer system to grant or revoke permissions to users). However, a role is not necessarily uniquely associated with an underlying user or identity and may be assumable by anyone that has a permission to assume the role. For example, a role may be assumable by a plurality of principals which includes users, roles, or a combination thereof.

In some cases, a customer of a computing resource service provider submits a request (e.g., to a policy management service) to determine whether their configurations are correct. A policy configuration may refer to as a configuration that governs the authentication and authorization of an account of the computing resource service provider (e.g., an account managed by the customer). In an embodiment, it is a configuration for who is allowed to perform which actions on which resources. For example, if a user or service is to create or modify a data storage bucket, there may be a security policy which grants that permission. Some types of correctness properties can be expressed as propositional logics which can be verified using a policy analyzer service. The policy analyzer service, which may be described in greater detail below, may be utilized to verify that individual security policies meet certain criteria, which may be defined by a set of best practices or rules. For example, the policy analyzer service can be used to determine whether a data storage bucket is not world-writeable (e.g., as a result of an administrator applying permissions incorrectly to an account).

There exist correctness properties which the policy auditing service is able to determine. For example, a customer may want to rigorously and provably determine that no compute instances can achieve administrator access. This may be a security requirement, so as to ensure that an attacker that is able to compromise a compute instance (e.g., a virtual machine instance) is not able to then cause further harm to the rest of the computing environment. In some embodiment, compute instances are granted privileges through a policy management service feature called role assumption. A role may refer to a credential than an entity (e.g., user, service, etc.) temporarily holds to perform actions allowed by that role. A role may be a principal of the policy management system that may have permissions to assume other roles. The policy auditing service, as described in greater detail below, may reason about all the roles that a principal may assume, and their associated permissions, and determine certain correctness properties of the system, such as determining, as in the example described above, whether a compute instance is able to achieve administrator access through one or more policy subsystem API calls (e.g., assuming different role(s)) to achieve privilege escalation.

In some embodiments, when reasoning about the permissions of a principal of a computing resource service provider, the possibility of privilege escalation through role assumption must be considered. For example, a principal may have a set of permissions that either explicitly or implicitly (e.g., lack of affirmative permission in a deny-by-default environment) denies access to a computing resource but allows the principal to assume a role that has a different set of permissions which does allow the principal to access the computing resource. By analogy, consider a Linux file system—to verify that a user cannot write to a file, it is not sufficient to verify that the user does not have write permissions to the file, but it may be necessary to also check that the user does not have permission to use administrative commands (e.g., su, sudo) that could be used to delete the file in question. In this example, the ability to issue administrative commands would, in an embodiment, grant the user the ability to modify its own permissions for the file. To account for security permission changes, the policy auditing service, in an embodiment, accounts for role assumption and/or policy configuration mutation to determine whether an invariant holds. In an embodiment, if role assumption permissions are misconfigured, it may be possible for principals to assume roles that escalate their privileges. Similarly, if a principal is accidentally granted permissions to mutate the policy subsystem (e.g., similar to a Linux user being able to use administrative commands) then those principals may have the ability to escalate their privileges by modifying their own permissions.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages, including improving computer security. Furthermore, techniques described herein may be rooted in computer technology to overcome a problem specifically arising in the realm of computer security. These may include auditing and detecting whether a user or principal of a computing resource service provider through assumable roles that may have different sets of permissions from the permissions associated with the user or principal.

FIG. 1 is an illustrative example of a computing environment 100 in which a policy auditing service is implemented, in accordance with at least one embodiment. The policy auditing service may be utilized to verify security requirements—also referred to as invariants—across multiple accounts and also accounts for mutative operations that may change the access rights associated with principals in the system. For example, role assumption may be a mutative operation because the source principal and the destination role may have different permissions.

The client computer system 102 may be any suitable computing device such as those described in connection with FIG. 20. The client computer system 102 may be a client of a computing resource service provider that provides various services such as policy auditing, policy analysis, and policy management. These services may be provided by a policy subsystem of the computing resource service provider. In an embodiment, the client communicates with a policy auditing service 104 of the computing resource service provider and submits (e.g., via a command line interface or a graphical user interface) a request 106. The request may include or include information usable to determine: a snapshot 108, a query 110, and an invariant 112. The request may be a web service application programming interface (API) request submitted over any suitable network, such as the Internet.

The snapshot 108 may refer to the policy management configuration for a particular account of the computing resource service provider. In an embodiment, the client computer system 102 submits a separate API request to a policy management system for the snapshot of an account. In some embodiments, the request includes multiple snapshots for multiple accounts. The snapshot 108 may be a file or document such as a JavaScript Object Notation (JSON) file, the request 106 including a network location of the file or document as a parameter of the request. The query 110 may indicate one or more principals, users, or roles to query. In an embodiment, the query indicates a user of the account which the invariant 112 is to be checked against. The query 110 may be encoded as a file or document such as a JSON file. The invariant may refer to a security requirement or constraint that is to be verified, tested, checked, etc., against the query 110. The invariant may be encoded as a security policy. For example, the invariant 112 may specify a set of permissions that are sufficient to access a certain computing resource that a principal indicated by the query is not supposed to have access to.

The policy auditing service 104 may be a server or other suitable computing device such as those described in connection with FIG. 20. The policy auditing service 104 may be in accordance with those described in connection with FIG. 2. In an embodiment, the policy auditing service 104 receives the request and utilizes the snapshot to generate a graph of roles that indicate different mutative operations that can be taken. For example, the graph may include all roles of an account and directed edges that indicate that a first role can assume a second role. There may, furthermore, be edges that connect one or more users to one or more nodes. It should be noted that in some embodiments, roles and users have different sets of permissions associated with them, such that it is possible for a first principal to lack access to a computing resource according to the first principal's permissions, but that a second principal that is assumable by the first principal has access to the computing resource according to the second principal's permissions. The policy auditing service 104 may include a model analysis engine that, if executed, traverses the graph or model and determines, based on the query 110, whether the invariant 112 holds. The policy auditing service 104 may utilize a policy analyzer service 114 such as those described in FIG. 6. As part of traversing the graph, the system may select a first node, determine the role associated with the node, and obtain the security policy 116A associated with the role. The system may further determine a second security policy 116B from the invariant 112. In some embodiments, the invariant 112 is a security policy or already encoded in the format of a security policy. The first security policy 116A and the second security policy 116B may be submitted to the policy analyzer service 114 which parses the security policies and uses a propositional logic translator 118 to determine respective propositional formulas for the policies. Those propositional formulas may be compared by a satisfiability engine 120 to determine an equivalence result, which may be performed in accordance with techniques discussed elsewhere in this disclosure, such as those described in connection with FIG. 6. The equivalence result 122 may indicate that the invariant does not hold, in which case a counter-example may also be provided that shows a series of operations that may be performed in violation of the invariant 112. Accordingly, the auditing system may provide those results to a user or administrator so that appropriate action may be taken, such as updating security policies for one or more users or roles so that the invariant 112 holds.

Figure 2:
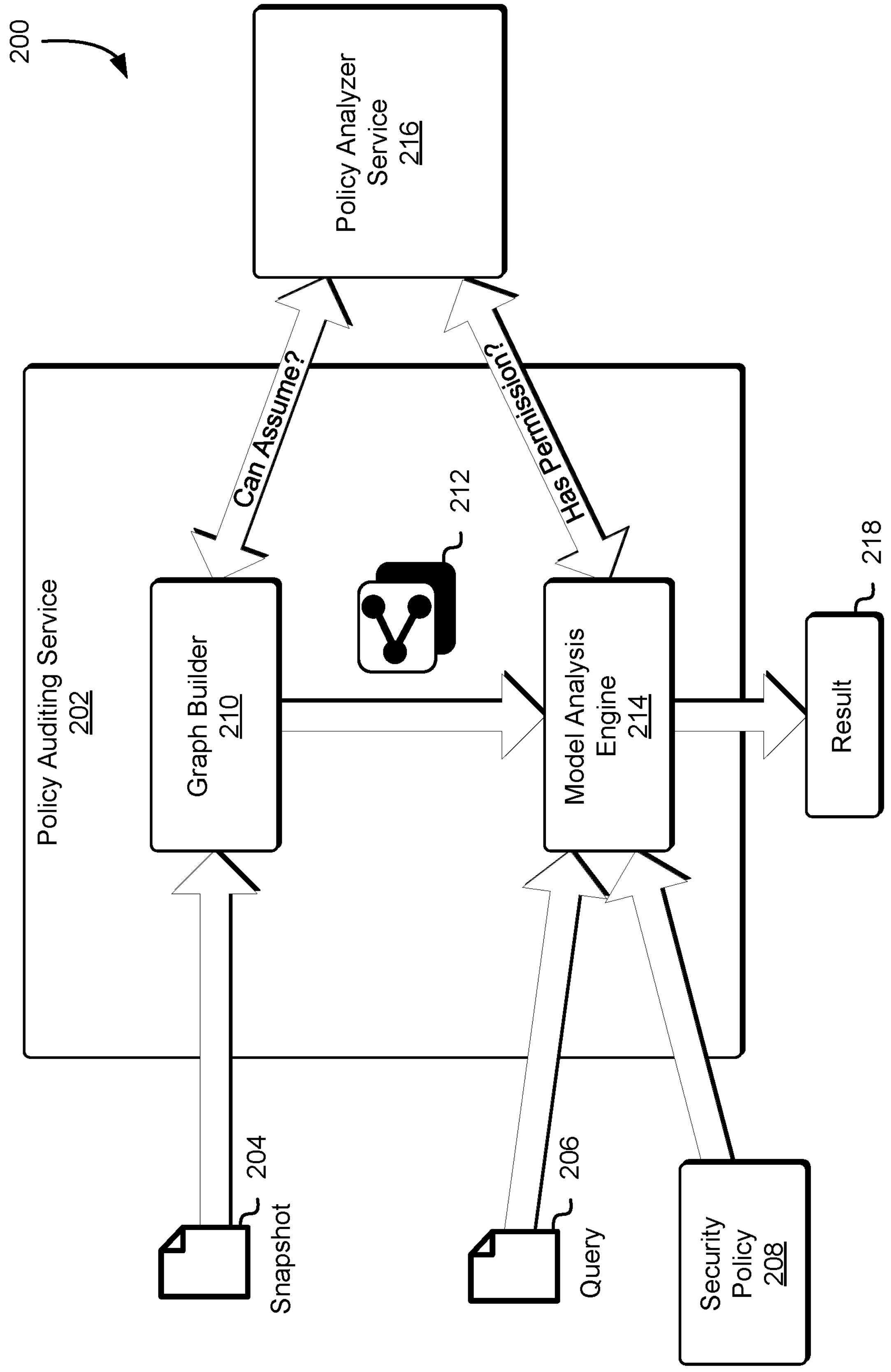
FIG. 2 is an illustrative example of a computing environment in which the policy auditing service can be implemented, in accordance with at least one embodiment.

FIG. 2 is an illustrative example of a computing environment 200 in which the policy auditing service 202 can be implemented, in accordance with at least one embodiment. The policy auditing service 202 may be utilized in various embodiments, such as those described in connection with FIGS. 1, 5, and 6. In an embodiment, the policy auditing service 202 is a service provided by a computing resource service provider. In some embodiments, the policy auditing service can be used for invariant model checking via a command line interface (CLI) and/or a graphical user interface (GUI). For example, the following CLI command can be run using the policy auditing service:

```
bazel run main—audit -d $(pwd)/res/sample_description.json -q
$(pwd)/res/sample_exists.json -p$(pwd)/res/datastore_delete_permissions.json
```

First, the policy management configuration description "-d, --descr-file<value>, which may be a JSON file which is the result of a call to the policy management service to get account authorization details. The call may be an API call that returns a snapshot 204 of the policy management configuration for a particular account. In an embodiment, the policy configuration is a file which is the result of a call to a policy subsystem to obtain account authorization details. The policy configuration description may be encoded in a language independent format such as JavaScript Object Notation. In some cases, an organization may have multiple accounts and may obtain snapshots for multiple accounts and provide those snapshots to the policy auditing service to reason about privilege escalation across accounts. In some embodiments, the CLI command supports additional accounts by specifying additional "-d, --descr-file<value>" flags.

Second, the query 206 can be specified, in an embodiment, with the "-q, --query-file <value>" parameter, which in an embodiment is a JSON file that encodes a query. Different types of queries may be supported. For example, a first type of supported query may be described based on the following example:

```
{
  "Type": "Basic",
  "User": "rn:ws:iam:884338371214:user/alice"
}
```

This basic query may take a single key, a "User" which is the user to which the query applies. In an embodiment, the above query indicates a query to check a property of all the policy management states reachable by the "alice" user. As another example, a second type of supported query may be based on the following:

```
{
  "Type": "Exists",
  "Ignore": [
    "rn:ws:iam:884338371214:user/master"
  ]
}
```

The exists query may take a single key—"Ignore"—which is a list of users to ignore when searching for a user to which the query applies. For example, the query may return true if there exists a user which satisfies the property being checked (but will ignore the "master" user indicated in the "Ignore" key). In an embodiment, this is used to check whether there are any users who can achieve administrator privilege outside of a list of users that are supposed to have those privileges.

Finally, the third parameter may be the property to check "-p, --permissions-file <value>" which, in an embodiment, is a JSON file in the format specified by a security policy 208. For example, the following policy file:

```
{
  "Version": "2015-07-16",
  "Statement": [
  {
    "Effect": "Allow",
    "Action": "storage: Delete*",
    "Resource": "rn:ws:storage:::*"
  }]
}
```

The policy specified in the permissions file specifies that any policy more permissive than the "storage:Delete*" permissions are to be checked by the policy auditing service.

In an embodiment, the graph builder 210 includes executable code that, if executed, generates a model. The graph builder 210 may be hardware, software, or a combination thereof, and may be implemented as a component (e.g., software application, dynamically linked library module) of the policy auditing service. In an embodiment, the graph builder 210 obtains a set of policy configurations from the policy management service (e.g., via an intra-service API call) and models the set of configurations to generate a model 212. The model 212 may be modeled as a Kripke structure. A Kripke structure may refer to a variation of the transition system used in model checking to represent the behavior of a system. Let AP be a set of atomic propositions (e.g., Boolean expressions over variables, constants, and predicate symbols. A Kripke structure, in an embodiment, is defined over AP as a set of tuples:

$$M=(S, I, R, L)$$

where S represents a finite set of states; I represents a set of initial states $I \subseteq S$; R represents a transition relation $R \subseteq S \times S$ such that R is left-total—in other words:

$$\forall s \in S \exists s' \in S \text{ such that } (s, s') \in R;$$

and L represents a labeling or interpretation function $L: S \rightarrow 2^{AP}$.

In an embodiment, policy auditing service 202 includes a model analysis engine 214 that provides an answer to the computational tree logic (CTL) formula AG φ where φ is a formula specified by the user. In an embodiment, the CTL form AG φ denotes an invariant. The model analysis engine 214 may be implemented as hardware, software, or a combination thereof, and may be a software application or module running within the context of the policy auditing service. Restricting the policy auditing service to operate only on invariants may, in some embodiments, allow the policy auditing service to use search procedures which are optimized and faster than general purpose CTL model checking.

Semantically, in an embodiment, the states, $s \subseteq S$, and the labeling function $L: S \rightarrow 2^{AP}$ denote a policy configuration. The set P: Entity×Action×Resource may represent the atomic propositions of a traditional model checking system. In an embodiment, they are triples of a principal, action, and resource. For example, a permission may be represented as:

(r:ws:iam::884338371214:user/alice, storage:DeleteObject, rn:ws:storage:::examplebucket/bucket1)

The set P may, in some embodiments, also include the conditions under which the principal has access to the specified action on a given resource; that is, P=Entity×Action×Resource×Condition. The condition may be processed during graph traversal to avoid false positives—for example, exploring paths with mutually exclusive conditions. In an embodiment, the transitions $R \subseteq S \times S$ denote mutative policy operations (e.g., policy changes). For example, a role assumption operation or other operations may be mutative. The initial states, $I \subseteq S$, in an embodiment, depend on the particular query specified in a request. In an embodiment, semantically, formulas $\varphi \subseteq P$ are sets of permissions. In an embodiment, the invariant AG φ is satisfied if the following holds:

$$\forall i \in I, s \in S \cdot iR^* s \Rightarrow \neg \varphi \subseteq L(s)$$

The R* denotes the reflexive, transitive closure of R. In some embodiments, the invariant states that all reachable states must not be more permissive than those specified in φ.

In an embodiment, sets of permissions, which may appear in the labeling function, L, and the formula φ, are represented symbolically as policy configurations as specified in the computing resource service provider. A policy analyzer service 216, in an embodiment, is used as an oracle for permission subset queries and may be implemented in accordance with those described elsewhere in this disclosure, such as those discussed in connection with FIG. 6. Techniques described in U.S. application Ser. No. 15/637,227 entitled "SECURITY POLICY ANALYZER SERVICE AND SATISFIABILITY ENGINE" and Ser. No. 15/637,238 entitled "SECURITY POLICY MONITORING SERVICE" may be utilized in connection with various embodiments described herein. In an embodiment, the Kripke structure is implemented as a graph where the nodes or vertexes are states and include the associated labeling. Edges between two nodes denote that the corresponding states are related according to R. The policy auditing service, in an embodiment, supports transitions corresponding to role assumption operations. In an embodiment, resolving the transitions is the most computationally expensive part of answering a query and may have a worst-case run-time of $|S|^2$ comparisons using the policy analyzer service 216. In an embodiment, the graph is constructed in a breadth-first iterative fashion, beginning with the nodes corresponding to the initial states. When a node, N, is added to the graph, a check is made to determine whether the invariant is satisfied. To do so, we take the labeling for that node and the policy configuration specified as the invariant from the user and call the policy analyzer service 216 to compare them ($\neg\varphi \subseteq L(s)$). In an embodiment, the Kripke structure is generally sparse in the sense that $|R| \ll |S|^2$. In an embodiment, optimizations such as model enumeration and/or syntactic heuristics are utilized to ensure that graph construction is proportional to $|R|$. If the invariant is satisfied, the policy auditing service may provide a result 218 as an affirmative response; however, if the invariant is not satisfied, the policy auditing service may provide, as part of the result, an indication that the invariant has been violated and/or a counter-example in the form of a set of API calls that will lead to a state which violates the invariant. The result 218 may be a response to a request (e.g., CLI command described above) submitted to the policy auditing service, the request indicating one or more snapshots, a query, and a security policy.

Figure 3:
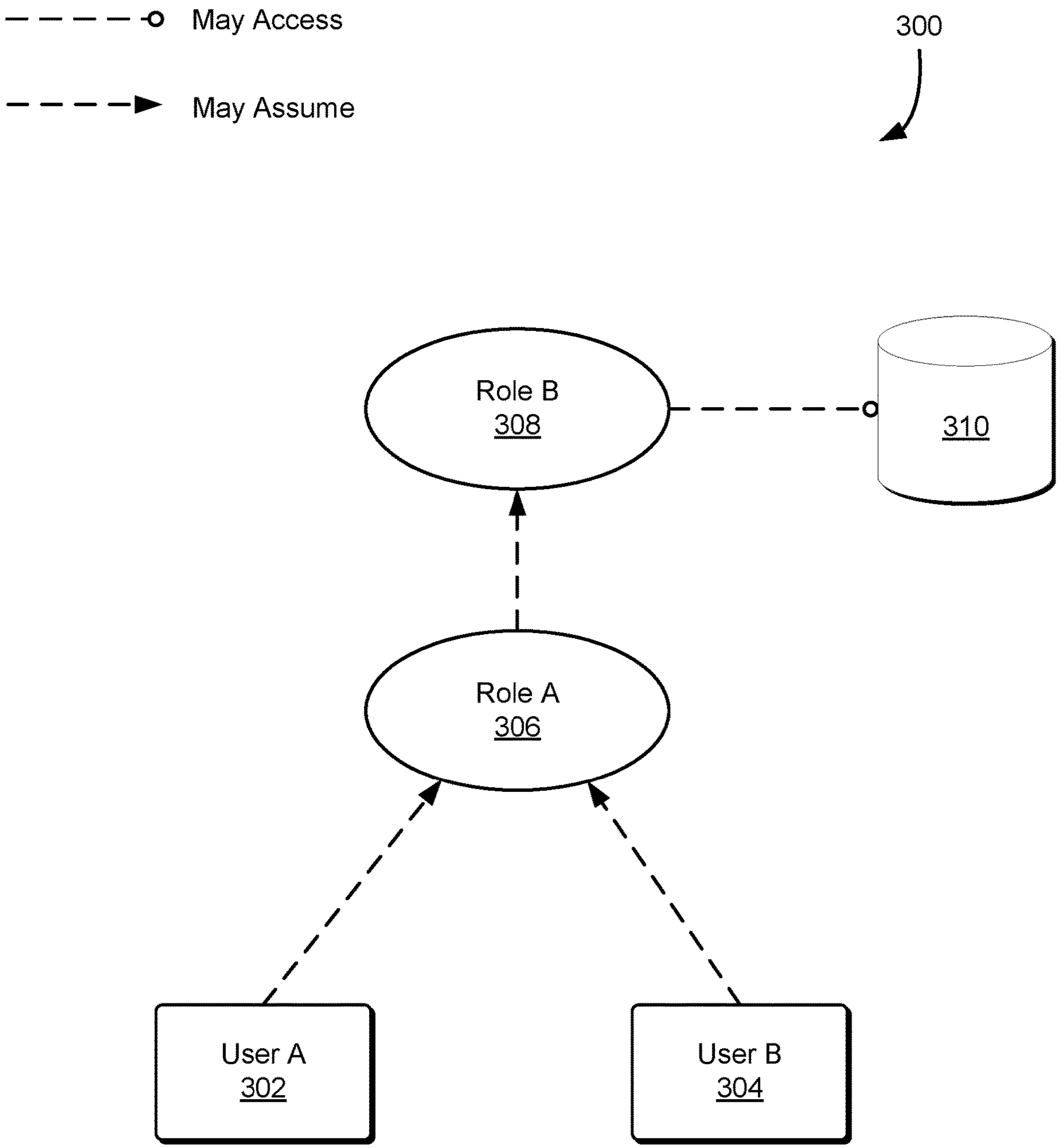
FIG. 3 is an illustrative example of a computing environment in which a policy auditing service can be used to verify a security requirement, in accordance with an embodiment.

FIG. 3 is an illustrative example of a computing environment 300 in which a policy auditing service can be used to verify a security requirement, in accordance with an embodiment. Consider an example in which a customer has a single user account (e.g., an environment in which the first user 302 "User A" is setup but the second user 304 "User B" is not set up) and the first user 302 manages a computing resource 310. For illustrative purposes, in this discussion, the computing resource 310 may be considered a data file stored within a data storage service of a computing resource service provider, although other types of computing resources may be considered in other contexts. Continuing with the example, the first user 302 may create a data file and, as the owner of the file, edit the permissions associated with the file so that nobody is able to read or write the file. The first user 302 may setup the first role 306 and the second role 308 and give herself permission to assume the first role 306 and attach permissions for the first role 306 to interact with different service providers of the computing resource service provider (e.g., access to a compute instance to run analytics on the data file) and a permission to assume the second role 308. The second role 308 may be a role that has exactly one permission that grants access to the computing resource 310 (e.g., the data file as discussed in this example). At this point in time, the computing environment satisfies a security requirement that the computing resource 310 is only accessible to the first user 302 (e.g., indirectly, through assumption of the first role 306 and then assumption of the second role 308 under the first role).

However, continuing with the example, at a later point in time, a second user 304 may be added (e.g., a lab assistant) and tasked to perform various actions that may include interacting with the different service providers but not intended to have access to the computing resource 310 (e.g., the data file). The second user 304 may be granted access to assume the first role 306 to do so. However, at this point a mistake in configuration has been made as the second user 304, upon having received access to assume the first role 306, may subsequently assume the second role 308 to access the computing resource 310, thereby escalating the second user's privileges beyond those that had originally been intended. In an embodiment, the policy auditing service can be used to automatically verify that the invariant (e.g., security requirement) that had been intended still holds. In particular, the policy auditing service may be used to verify that there does not exist users other than the first user 302 that can access the computing resource. Stated in other terms, the invariant may be described as the following logical expression:

$$\nexists\, u \in \text{User} \setminus \{\text{User}_A\} \cdot u \ \text{computing\_resource}$$

where $\text{User}_A$ refers to the first user and computing_resource refers to the computing resource 310 (e.g., the data file described in the example above).

An administrator or other privileged user (which may be the first user 302, in some embodiments) may define the security requirement or invariant as a propositional logic expression or as an expression that can be parsed to determine a propositional logic expression. The security requirement may be submitted to the policy auditing service and the policy auditing service may determine whether the security requirement is satisfied upon submission of the security requirement. In some embodiments, the policy auditing service monitors whether the security requirement or invariant holds over time. For example, in the example described above, the security requirement may be violated when the second user 304 is granted access rights to assume the first role 306. In an embodiment, the policy auditing service verifies whether one or more security requirements or invariants hold in response to an event. The event may be a temporal event—for example, that the invariants are checked on a periodic schedule such as once a day. The event may be detection of a change in the state of the system, such as detection of an API call to change the permissions of the policy subsystem. In an embodiment, the policy auditing service utilizes an event-driven compute service to detect the occurrence of events such as those described above and, upon detecting the occurrence of the event, causes the event-driven compute service to cause execution of an event-driven function that verifies whether the proposed change to the permissions of the policy subsystem would violate any of the security requirements or invariants. In some cases, the system may detect that fulfilling the API call would violate a security requirement or that an invariant would not hold, and an appropriate response is take. The response, in an embodiment, is a notification to an administrator that indicates one or more of the following: an indication of the API call; the security requirement or invariant that was violated; a counter-example that demonstrates how the security requirement or invariant is violated; or any combination thereof. In some embodiments, fulfillment of the API call is contingent upon using the policy auditing service to determine in a positive and rigorous manner (e.g., provably correct) that applying the policy change would not violate any security requirements. In some embodiments, the verification is performed synchronously as part of processing an API request to apply a policy change. In an embodiment, the synchronous verification is performed at least in part using a policy management service such as those described elsewhere in this disclosure, such as those discussed in connection with FIG. 9. In an embodiment, a client of the policy management service submits an API call to change a policy setting. A change in this context may include creating a new security policy, modifying an existing security policy, deleting a security policy, and, generally speaking, any change that could change the state of the system. Upon detecting a proposed policy change, the policy management service may forward the proposed policy change to the policy auditing service and the policy auditing service may determine whether one or more security requirements are violated if the proposed policy change is applied to the system. If the policy auditing service responds indicates to the policy management service that a security requirement would be violated, the policy management service may decline to apply the change and respond to the API request with an indication that the change violates one or more security requirements. In an embodiment, the response also includes an indication of the security requirement that the policy change violates. However, if the policy auditing service responds to the policy management service with an indication that no security requirements are violated, the policy management system may apply the change. Application of the change may be contingent upon an affirmative indication by the policy auditing service that no security requirements are violated by the proposed policy change.

Figure 4:
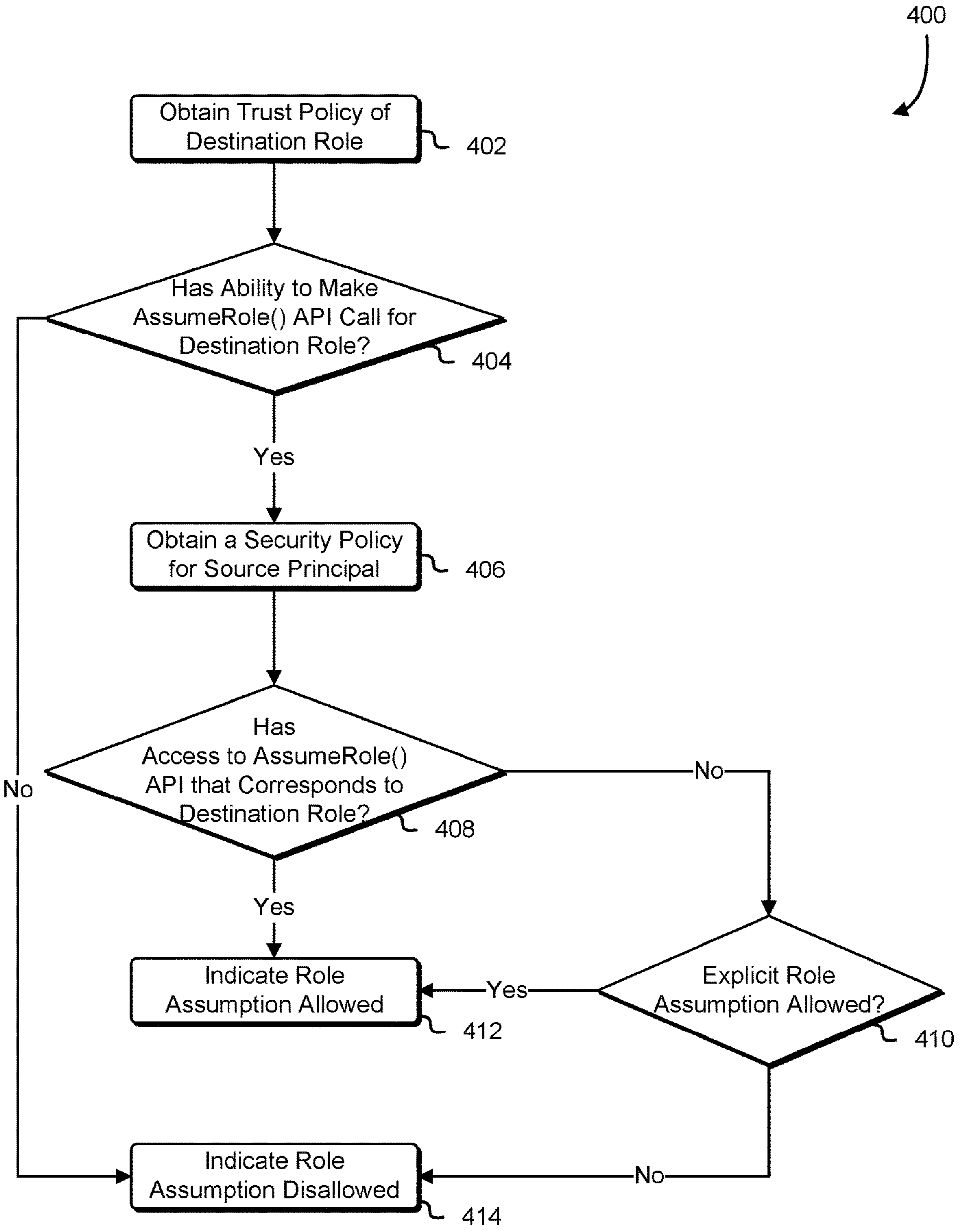
FIG. 4 shows an illustrative example of a process for determining whether a role is assumable, in accordance with an embodiment.

FIG. 4 shows an illustrative example of a process 400 for determining whether a role is assumable, in accordance with an embodiment. Some or all of the process 400 (or any other processes described herein, or variations and/or combinations thereof) may be performed under the control of one or more computer systems configured with computer-executable instructions and may be implemented as code (e.g., computer-executable instructions, one or more computer programs, or one or more applications) executing collectively on one or more processors, by hardware, software, or combinations thereof. The code may be stored on a computer-readable storage medium, for example, in the form of a computer program comprising a plurality of computer-readable instructions executable by one or more processors. The computer-readable storage medium may be a non-transitory computer-readable medium. In some embodiments, at least some of the computer-readable instructions usable to perform the process 400 are not stored solely using transitory signals (e.g., a propagating transient electric or electromagnetic transmission). A non-transitory computer-readable medium may include non-transitory data storage circuitry (e.g., buffers, caches, and queues) within transceivers of transitory signals. In an embodiment, the process 400 is performed by any suitable system such as the policy auditing service or a component therein, such as those described in connection with FIGS. 1 and 2. The process 400 may be performed in connection with the generation of a model, such as those described in connection with FIGS. 2 and 5.

The system, in an embodiment, obtains 402 the trust policy of a destination role. The system may have received a request to determine whether a source principal (e.g., role or user) can assume a destination role. The request may be an API request such as a web service API request or an internal API request (e.g., performed wholly within a policy auditing service or system between components of the policy auditing service or system). In some embodiments, the system obtains the trust policy for the destination role as part of the request (e.g., from the requestor). In some embodiments, the system receives a resource name identifier from a requestor and provides the identifier to a policy subsystem such as a policy management service and the policy management service provides the trust policy as part of a response. The policy subsystem may perform authentication and/or authorization processes to determine that the system performing the process 400 is authorized and/or authenticated. The system may obtain the trust policy of the destination role directly (e.g., as a JSON file included in a response to a request for the trust policy) or indirectly (e.g., the system receives a response that includes a network location where the JSON file can be retrieved). The trust policy may include a list of principals that are allowed to assume the destination role.

The obtained trust policy may be used to determine whether 404 the source principal is trusted to assume the destination role. In an embodiment, the determination is made based on whether the trust policy includes the source principal in a list of principals that are allowed to assume the destination role. The source principal can be indicated as being allowed to assume the destination either explicitly (or directly) or implicitly (or indirectly). For example, consider a role that has a trust policy that indicates the following is trusted to assume said role: "rn:ws:iam::111122223333:root"—the root resource name identifier of the policy management namespace may indicate, indirectly or implicitly, that all roles and/or users (e.g., all principals under the root) are trusted to assume the role associated with such a trust policy. Consider a different trust policy: "rn:ws:iam::111122223333:role/Foo"—such a trust policy or entry thereof may indicate, directly or explicitly, that the "Foo" role is trusted to assume the role associated with such a trust policy. If the source principal is not indicated as trusted in the list, the system may indicate 414 that role assumption is disallowed, for example, by submitting a message that includes a Boolean value that indicates the source principal is not allowed to assume the destination role. It should be noted that in some embodiments, the trust policy is sufficient to determine that role assumption is allowed and/or disallowed. In some embodiments, the inclusion of the source principal in a list of the trust policy is a necessary but not sufficient condition for assumption of the destination role.

In an embodiment, such as those in which the source principal's inclusion in a trust policy is a necessary but not sufficient condition, the system performing the process 400 obtains 406 a security policy for a source principal. The source principal may be a user or a role of the system. In an embodiment, the system obtains the security policy for the principal by making an intra-service API call to a policy subsystem (e.g., policy management service) that includes a resource name identifier of the principal. The policy subsystem may, in response to the request, return the security policy associated with the principal, the security policy may include a set of security permissions.

In an embodiment, the system uses the security policy of the principal to determine whether 408 the source principal has access to perform an AssumeRole( ) API that corresponds to the destination role. More generally, the security policy is checked to determine whether the permissions allow for an action to be performed that allows the source principal to assume the destination role, for example, through the use of an AssumeRole( ) API. In some embodiments the system checks for the existence of a permission that grants access to an API that allows the principal to submit requests to assume a role and also verifies that the policy lacks a permission that affirmatively denies access to assume the destination role. Performing both checks may be required in some systems to ensure all permissions are enforced. In some cases the absence of any information as to whether to allow or deny the assumption of the destination role is an implicit denial of such a permission (e.g., a deny-by-default system).

If the system determines that the principal, based on its security policy, has access to call the API to assume the destination role, the system may indicate 412 that role assumption is allowed. The system may provide the indication in any suitable manner, such as by providing a response or message that indicates a Boolean value indicating that the assumption of the destination role is allowed. However, if the source principal does not have a security policy that allows access to call an API to assume the destination role, the system may determine whether 410 explicit role assumption is allowed. The system may determine whether explicit role assumption is allowed by performing a two-step process in which the system verifies that the destination role has a trust policy that explicitly or directly trusts the source principal and that the security policy of the source principal does not explicitly deny access to the API for role assumption. In an embodiment, explicit denial of access refers to a permission with a "DENY" or "DISALLOW" Effect (e.g., as discussed in connection with FIG. 7) associated with an Action for performing role assumption. In some embodiments, the system also requires that the destination role and the source policy to be in the same account. If these checks are satisfied, the system may indicate 412 that role assumption is allowed and the destination role may be added as a node or vertex to a graph, for example in the manner described in connection with FIG. 2. However, if one or more of the checks or conditions described above are not satisfied, the system may indicate 414 that role assumption is disallowed, and the destination role will, as a result, not be added as a node or vertex to a graph of assumable roles.

Figure 5:
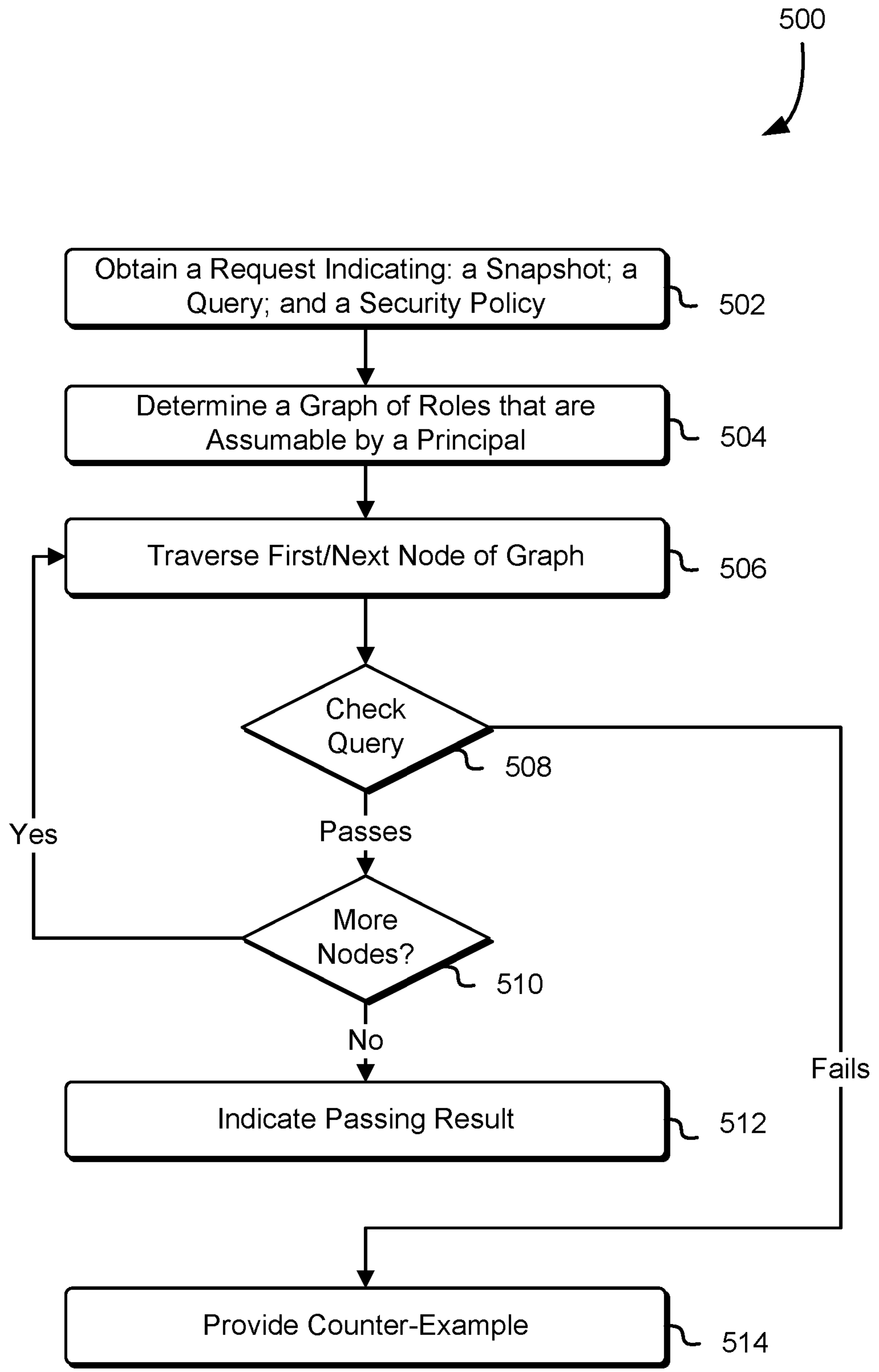
FIG. 5 shows an illustrative example of a process for auditing security policies, in accordance with an embodiment.

FIG. 5 shows an illustrative example of a process 500 for auditing security policies, in accordance with an embodiment. Some or all of the process 500 (or any other processes described herein, or variations and/or combinations thereof) may be performed under the control of one or more computer systems configured with computer-executable instructions and may be implemented as code (e.g., computer-executable instructions, one or more computer programs, or one or more applications) executing collectively on one or more processors, by hardware, software, or combinations thereof. The code may be stored on a computer-readable storage medium, for example, in the form of a computer program comprising a plurality of computer-readable instructions executable by one or more processors. The computer-readable storage medium may be a non-transitory computer-readable medium. In some embodiments, at least some of the computer-readable instructions usable to perform the process 500 are not stored solely using transitory signals (e.g., a propagating transient electric or electromagnetic transmission). A non-transitory computer-readable medium may include non-transitory data storage circuitry (e.g., buffers, caches, and queues) within transceivers of transitory signals. In an embodiment, the process 500 is performed by any suitable system such as the policy auditing service or a component therein, such as those described in connection with FIGS. 1 and 2. The process 500 may be performed in connection with techniques described in connection with FIG. 4.

The system may obtain 502 a request indicating a snapshot, a query, and a security policy. The system may obtain the request as part of an application programming interface request, which may be submitted to the system via a command line interface or a graphical user interface. In an embodiment, the system receives a request that indicates a network location of a document that includes a snapshot of the policy management configuration for a particular account of a computing resource service provider. The account may include multiple principals, such as users and roles. The snapshot may be obtained from a policy management service, such as those described in FIG. 9. The request may further include a network location of a query document that includes a query that is checked. In an embodiment, the query includes the resource name identifier of a user account to check the security policy constraints against. In an embodiment, the query includes a list of principals to exclude from checking. Finally, the security policy may refer to a security requirement or invariant that must hold in order for a passing result to be determined. In an embodiment, the request encodes one or more of the parameters described above as network locations where documents (e.g., JSON files) may be found that encode the respective snapshot, query, and/or security policy.

The system may determine 504 a graph of roles that are assumable by a principal. The determination may be made using techniques described in connection with FIG. 2. For example, the system may model the system using a Kripke structure by identifying a set of states, a set of initial states, a set of mutative transitions, and a labeling function. The system may, in an embodiment, utilize techniques described in connection with FIG. 4. In an embodiment, the system determines a principal (e.g., user account specified in the query) and obtain the security policy associated with the user. The security policy may indicate actions and/or resources that the principal may interact with. In an embodiment, the security policy of the principal is checked to determine whether the principal has access to call an API that is used to assume roles. If the principal has access to assume roles, the system may then identify one or more roles (e.g., all roles in the account) and, for each role, obtain the trust policy associated with the role. If the trust policy lists the principal, then the graph may be updated to include an edge (e.g., directed vertex) from a first graph node corresponding to the principal to a second graph node corresponding to the role. The process may be repeated for each candidate node, such that the graph is built with a directed edge from the principal to each node that can be assumed by the principal. Note that, in some cases, the query may include a list of principals to ignore. In an embodiment, the system may then select a node that was added to the graph and obtain a security policy for the role corresponding to that node. That security policy may then be parsed, as discussed above, to determine whether that role is able to call an API to assume a different role, and may then verify trust policies against that role in the same or similar manner described above. This process may be repeated until the entire graph is generated. Note that, in an embodiment, each role may have at most one corresponding graph node, and that it is unnecessary to repeat the graph-building process for a node multiple times. The graph may be built based at least in part on a static snapshot of one or more accounts at a point in time.

In an embodiment, the system traverses 506 the first/next node of the graph. The first node of the graph, in an embodiment, corresponds to a node that is directly assumable by the principal (e.g., the principal is not required to assume an intermediate role to successfully assume the first node). The query may be checked 508 as described in FIG. 2 above, and may utilize a policy analyzer service to determine whether the security policy of the first node is at least as permissive or more permissive than the security policy indicated by the request. If the query fails, the system may receive, from the policy analyzer service, a counter-example that demonstrates a series of API calls that would result in the principal receiving more permissive access permissions than those of the security policy in the request. In some embodiments, the counter-example may be provided in cases where the security policy associated with the role and the security policy of the request are incomparable. The system may provide 514 the counter-example as a response to the request.

If the query passes, the system may determine whether 510 there are more nodes in the graph to traverse. Each node, in an embodiment, represents a different role that can be assumed by one or more principals. If there are more nodes in the graph to traverse, the system may traverse the next node in the graph and repeat 506-510 until each node has been traversed. If, after determining that none of the nodes in the graph are more permissive than the invariant or security requirement, the system may indicate 512 a passing result as the system has comprehensively and provably demonstrated that there is no set of mutative operations a principal can perform to gain permissions that are more permissive than the security constraint or invariant (e.g., encoded as the security policy of the request).

In the context of a computing resource service provider, clients may make requests to access resources of the computing resource service provider. A client may have a security policy associated with the client such that the security policy may be utilized as part of determining whether to grant the client access to one or more computing resources, such as computing resources that the client may request via application programming interface (API) calls which may be routed over a network to the service provider. In some cases, the computing resource service provider may provide users the ability to create, change, or delete security policies or portions of security policies. A security policy analyzer service may be utilized to compare security policies and determine whether a first security policy is more permissive than a second security policy.

In various examples, a client may request a policy analyzer service to analyze security policies to determine the relative permissiveness of the policies—in other words, the policy analyzer may be used to determine whether two security policies are equivalent, whether a first security policy is more permissive than a second security policy, and more. The policy analyzer service may be a service of a computing resource service such as those described elsewhere in this disclosure, and may be accessible via API calls which may be routed over a network to a service provider. A client computing device may be operable to access services, computing resources, etc., of a computing resource service provider. In various examples, the client computing device communicates with a policy analyzer service via web API calls.

A client computing device, on behalf of a client, may utilize a policy analyzer service to determine the equivalency of two or more security policies. The client may, using a client computing device, make an API request to the policy analyzer service that includes two or more security policies. Generally speaking, a security policy may be information that specifies one or more security permissions. Security permissions may be elements of the security policy that define access rights associated with resources and/or principals of a system. For example, a permission may be used to grant or deny access to computing resources of a computing resource service provider. In some cases, a permission may specify a principal, a computing resource, an action, a condition, and an effect. In some embodiments, a permission may also specify a plurality of one or more of these elements such as, for example, a set or class of users, a collection of resources, several different actions, and/or multiple conditions.

A security policy may include one or more permission statements as well as additional information such as versioning information and policy-wide information. A security policy may include a set of conditions that can be utilized to determine whether to grant access or deny access to computing resources in various contexts, such as in the context of different users, different actions being performed on the computing resources, and different conditions of access. An authorization module or authorization service, such as those described elsewhere in this disclosure, may be utilized to evaluate whether to grant or deny a request to access resources based at least in part on evaluating a security policy in connection with the request. In some cases, policy-wide information is included in a policy header at the beginning of a policy or may even be stored separately from (and in association with) a policy document. A policy may include multiple policy statements, such as those described elsewhere in connection with FIG. 2.

As described throughout this disclosure, a policy analyzer service may be a service of a computing resource service provider and may support one or more APIs that a client may utilize to submit requests to the policy analyzer service to evaluate security policies, such as an API to determine whether a first security policy is more permissive than a second security policy and whether two or more security policies are equivalent. In this context, permissiveness is used to describe access to resources. For example, if a first policy can be utilized to access to a first computing resource (e.g., resource "A") and a second resource (e.g., resource "B") and a second policy grants access only to computing resource "B," then the first policy may be described as being more permissive than the second policy because there exists a computing resource which the first policy grants access to which the second policy does not grant access to and there does not exist a resource that the second policy grants access to which the first policy does not grant access to. Two policies may be equivalent if they both can be utilized to access to the same resources and deny (either implicitly or explicitly) access to the same resources. Generally, speaking, if two policies are not equivalent, they may be said to lack equivalency. In some cases, if a first policy grants access to a first computing resource "A" and a second computing resource "B" and a second policy grants access to the second computing resource "B" and a third computing resource "C" the polices may be said to be incomparable.

An API call supported by the policy analyzer service may accept two security policies and determine whether they are equivalent, whether one policy is more permissive than the other policy, whether the policies are incomparable, and so on. As a second example, an API call may accept two or more security policies and determine whether all of the security policies provided as part of the API request are equivalent. As a third example, an API call may accept a single security policy and compare the security policy against one or more best practices policies. The best practices policies may be a set of security policies that are determined to be a set of permissions which are should not be allowed. For example, a first best practices policy may be that a particular data container should not be world-writeable (e.g., any principal, even a guest user or anonymous user can write to the container). The API may verify that best practices policies are being followed by determining that the received policy is not more permissive than each of the best practices policies. Examples of best practices policies may include resources being world writeable, world readable, world accessible, and the like. In some embodiments, a collection of best practices policies may be determined based on the API call, the type of computing resource requested, and other context information.

A policy analyzer service may include multiple components and/or modules such as a policy parser; a propositional logic translator; and a satisfiability engine. The policy parser may be a component or module that receives a security policy and obtains one or more permission statements from the policy. For example, if the client provides a first policy "A" and a second policy "B," the policy parser may obtain a first set of permission statements from policy "A" and a second set of permission statements from policy "B." The permission statements may each be associated with the granting or denying access to computing resource. A propositional logic translator may convert permission statements into one or more constraints described using propositional logic. The constraints may be described in various formats and in accordance with various standards such as SMT-LIB standard formats, CVC language, and Center for Discrete Mathematics and Theoretical Computer Science (DIMACS) formats. The propositional logic expressions generated by the propositional logic translator may represent a set of constraints that must be satisfied for the corresponding permission statement to be in effect.

A satisfiability engine may be used to compare the first propositional logic expression and the second propositional logic expression to determine whether one propositional logic is more permissive than the other. A satisfiability engine may be used to analyze the permissiveness of two or more propositional logic expressions. The satisfiability engine may generate additional propositional logic constraints as part of determining whether the first propositional logic expression is more permissive than the second propositional logic expression. The constraints may be generated and evaluated in addition to constraints of the first propositional logic expression and the second propositional logic expression. The constraints may be generated based at least in part on what a client requests. For example, the satisfiability engine may generate constraints that are satisfied only under circumstances where a first policy grants access to a resource and a second policy denies access to the resource or is neutral regarding the resource in response to a request from a caller to determine whether a first propositional logic expression is more permissive than a second propositional logic expression. The satisfiability engine may be used to verify whether the propositional logic constraints (e.g., those obtained from the first and second propositional logic expressions and those generated by the satisfiability engine. In some embodiments, a command may be used to determine whether the set of constraints are satisfiable. A formula may be satisfiable if there is an interpretation that makes all the asserted formulas true. In other words, the model is satisfiable if each of the constraints is satisfied under some conditions. In some embodiments, the satisfiability engine may be implemented at least in part using a SMT solver such as Z3, as described in https://github.com/Z3Prover/z3.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

Figure 6:
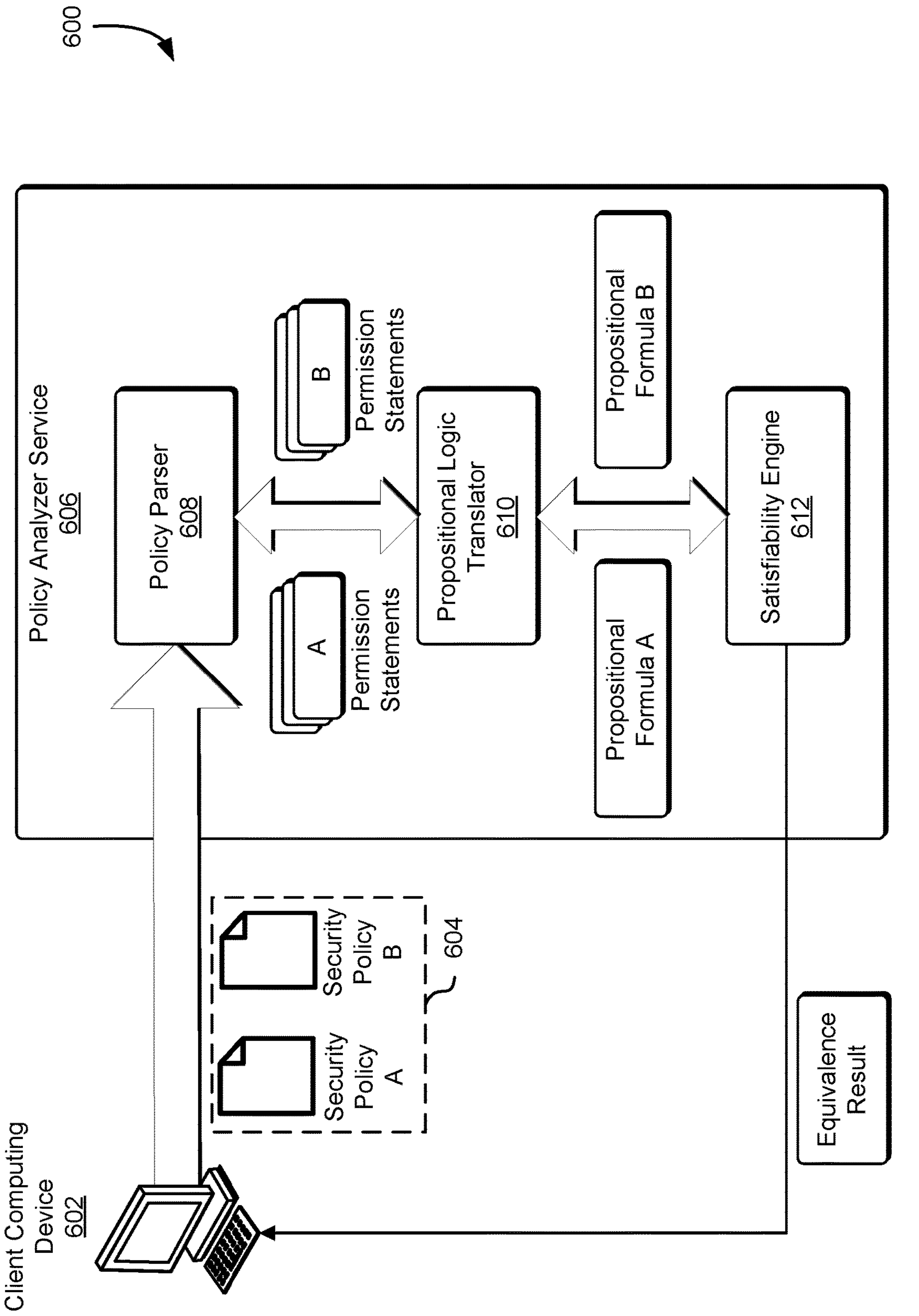
FIG. 6 illustrates an environment in which various embodiments can be implemented.

FIG. 6 is an illustrative example of an environment 600 in which various embodiments of the present disclosure can be practiced. In an embodiment, the environment 600 includes: a client computing device 602; security policies 604; a policy analyzer service 606; a policy parser 608; a propositional logic translator 610; and a satisfiability engine 612. The environment 600 illustrates an example in which a client may request a policy analyzer service 606 to analyze security policies 604 to determine the relative permissiveness of the policies—in other words, the policy analyzer may be used to determine whether the security policies 604 are equivalent, whether a first security policy (e.g., Security Policy A shown in FIG. 6) is more permissive than a second security policy (e.g., Security Policy B shown in FIG. 6), and more.

The client computing device 602 may be a client of a service that provides access to computing resources. In some embodiments, the computing resources are accessed via application programming interface (API) calls which may be routed over a network to a service provider. The client computing device 602 may be an entity operable to access services, computing resources, etc., of a computing environment. In some embodiments, the client computing device 602 may communicate with a policy analyzer service 606 via web API calls.

In some embodiments, the client computing device 602 utilizes a policy analyzer service 606 to determine the equivalency of two or more security policies 604. The client may make an API request to the policy analyzer service that includes two or more security policies 604. A security policy may be information (e.g., encoded in a file) that specifies one or more security permissions. Security permissions may be elements of the security policy that define access rights associated with resources and/or principals of a system. For example, a permission may be used to grant or deny access to computing resources of a computing resource service provider. Policies may be expressed in a language independent format such as JavaScript Object Notation (JSON). Examples discussed in this disclosure may be in JSON format or in a format similar to JSON and as illustrations of various embodiments which may be implemented. Of course, various other formats which may be utilized in the manner described in connection with JSON and JSON-like formats are also contemplated and within the scope of this disclosure. A security policy may include one or more permission statements as well as additional information such as versioning information and policy-wide information. In some cases, policy-wide information is included in a policy header at the beginning of a policy or may even be stored separately from (and in association with) a policy document. A policy may include multiple policy statements, such as those described elsewhere in connection with FIG. 7.

Figure 9:
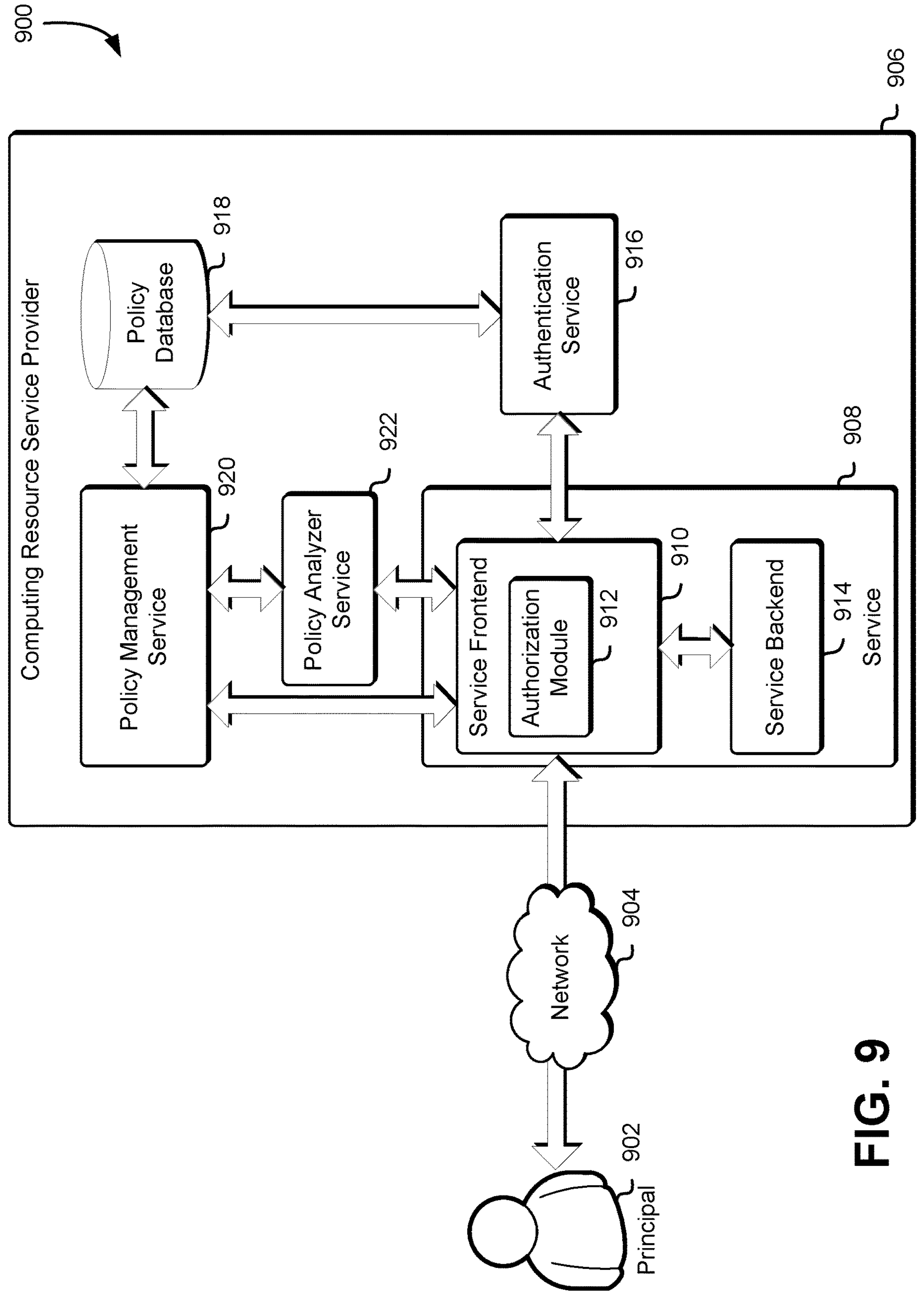
FIG. 9 illustrates an environment in which a distributed computer system may utilize the various techniques described herein.

The policy analyzer service 606 may be a service of a computing resource service provider (e.g., a computing resource service provider described elsewhere in connection with FIG. 9). The policy analyzer service 606 may be implemented using hardware, software, and a combination thereof. In some cases, the policy analyzer service 606 supports one or more APIs that a client (e.g., the client computing device 602) may use to provide requests to the policy analyzer service 606. The policy analyzer service 606 may support one or more APIs that are used to evaluate security policies (e.g., the security policies 604 described in connection with FIG. 6), such as an API to determine whether a first security policy is more permissive than a second security policy and whether two or more security policies are equivalent.

In some embodiments, permissiveness is used to describe the grant of access to resources. For example, if a first policy grants access to a first computing resource (e.g., resource "A") and a second resource (e.g., resource "B") and a second policy grants access only to computing resource "B," then the first policy may be described as being more permissive than the second policy because there exists a computing resource which the first policy grants access to which the second policy does not grant access to and there does not exist a resource that the second policy grants access to which the first policy does not grant access to. Two policies may be equivalent if they both grant access to the same resources and deny (either implicitly or explicitly) access to the same resources. In some cases, equivalency may refer to two policies explicitly granting access to the same resources and explicitly denying access to the same resources—in other words, if a first policy explicitly denies access to a computing resource and a second policy implicitly denies access to a computing resource (e.g., by not affirmatively granting access in a deny-by-default context) may lack equivalency in some embodiments. Generally, speaking, if two policies are not equivalent, they may be said to lack equivalency. In some cases, if a first policy grants access to a first computing resource "A" and a second computing resource "B" and a second policy grants access to the second computing resource "B" and a third computing resource "C" the polices may be said to be incomparable. It should be noted that unless otherwise specified, examples described herein may implement a deny-by-default security model in which access to a computing resource is denied unless there exists an explicit grant of access to the computing resource. It should furthermore be noted that in the context of these discussions, security policies may be utilized to grant or deny access to resources in the context of a computing resource service provider where a request to access resources may be evaluated by an authorization module or authorization service by utilizing a security policy applicable to the request. An applicable security policy may be a security policy associated with the requestor, a security policy associated with a token that the requestor presents, and more. Such techniques may be performed in accordance with a computing resource service provider described elsewhere in connection with FIG. 9.

The policy analyzer service 606 may be used to determine the permissiveness of one or more policies. For example, an API call supported by the policy analyzer service 606 may accept two security policies and determine whether they are equivalent, whether one policy is more permissive than the other policy, whether the policies are incomparable, and so on. As a second example, an API call may accept two or more security policies and determine whether all of the security policies provided as part of the API request are equivalent. As a third example, an API call may accept a single security policy and compare the security policy against one or more best practices policies. The best practices policies may be a set of security policies that are determined to be a set of permissions which are should not be allowed. For example, a first best practices policy may be that a particular data container should not be world-writeable (e.g., any principal, even a guest user or anonymous user can write to the container). The API may verify that best practices policies are being followed by determining that the received policy is not more permissive than each of the best practices policies. Examples of best practices policies may include resources being world writeable, world readable, world accessible, and the like. In some embodiments, a collection of best practices policies may be determined based on the API call, the type of computing resource requested, and other context information.

A policy analyzer service 606 may include multiple components and/or modules such as a policy parser 608; a propositional logic translator 610; and a satisfiability engine 612. In some embodiments, the functions of various components and/or modules may be delegated to other services with which the policy analyzer service 606 may utilize. For example, the policy analyzer service 606 may, in some embodiments, utilize a different service for performing functionality related to parsing policies.

The policy parser 608 may be a component or module that receives a security policy (e.g., a security policy received from a client in connection with an API call or obtained via a policy management service) and obtains one or more permission statements from the policy. For example, if the client provides a first policy "A" and a second policy "B" to the policy analyzer service 604, the policy analyzer service 606 may use the policy parser 608 to obtain a first set of permission statement from policy "A" and a second set of permission statement from policy "B." The permission statements may each be associated with the granting or denying access to computing resource. The permission statements may be in a particular format such as JSON, Aspen, and more.

As described herein, propositional logic may refer to a symbolic logic that relates to the evaluation of propositions that may evaluate to either being true or false. Propositional logic may be utilized to evaluate the logical equivalence of propositional formulas. A propositional formula. A propositional formula may be a statement in accordance with a syntax that includes propositional variables and logical connectives that connect the propositional variables. Examples of logical connectives or logical operators may include: "AND" (conjunction), "OR" (disjunction), "NOT" (negation), and "IF AND ONLY IF" (biconditional) connectives. Propositional logic may also be described herein as a "propositional expression" or a "propositional logic expression." In some embodiments, first-order logic may be utilized in place of propositional logic. First-order logic may refer to a formal system that utilizes quantifiers in addition to propositional logic. Examples of quantifiers include "FOR ALL" (universal quantifier) and "THERE EXISTS" (existential quantifier). Unless explicitly noted, embodiments of this disclosure described in connection with propositional logic may also be implemented using first-order logic—for example, in some embodiments, a first-order logic translator (not shown in FIG. 6) may be utilized in place of a propositional logic translator 610 to translate permission statements to first-order logic expressions and a satisfiability engine may evaluate one or more first-order logic expressions to determine whether the expressions are equivalent.

Permission statements (e.g., those obtained by the policy parser 608) may be provided to a propositional logic translator 610. A propositional logic translator 610 may receive a permission statement (e.g., in JSON format) and convert the permission statement into one or more constraints described using propositional logic. The constraints may be described in various formats and in accordance with various standards such as SMT-LIB standard formats, CVC language, and Center for Discrete Mathematics and Theoretical Computer Science (DIMACS) formats.

For example, a permission statement (e.g., a permission statement included as part of a security policy) may be described as:

```
"Statement": [
{
  "Effect": "Allow",
  "Resource": *,
  "Principal": *,
  "Action": "put*"
}]
```

The corresponding propositional logic constraints may be generated from the example policy statement may be described as:

(assert policy.statement.resource)

(assert policy.statement.principal)

(assert (=policy.statement.action (or (and (="storage" actionNamespace) (str.prefixof "put" actionName)

(assert (=policy.statement.effect.allows (and policy.statement.action policy.statement.resource policy.statement.principal)))

(assert (not policy.statement.effect.denies))

(assert (=policy.allows (and (not policy.denies) policy.statement.effect.allows)))

(assert (=policy.denies policy.statement.effect.denies))

The propositional logic expressions generated by the propositional logic translator 610 may represent a set of constraints that must be satisfied for the corresponding permission statement to be in effect. The constraints described above correspond to a set of constraints that are necessarily satisfied if the preceding permission statement allowing access to APIs starting with "put" (e.g., "put-object") to be fulfilled.

In some embodiments, the client computing device 602 transmits (e.g., on behalf of a client end-user) a web API request to the policy analyzer service 606 requesting that the policy analyzer service 606 determine whether a first security policy (e.g., "Security Policy A" illustrated in FIG. 6) is more permissive than the second security policy (e.g., "Security Policy B"). The security policies 604 may be encoded in the web API request or information usable to obtain the security policies (e.g., a pointer or a URI indicating the location where a policy may be obtained) may be provided. The policy analyzer service 606 may obtain the security policies 604 (e.g., either directly from the request or via a policy management service using a URI encoded in the request) and utilize a policy parser 608 to obtain a first set of permission statements from the first policy and a second set of permission statement from the second policy. The policy statements may be provided to a propositional logic translator 610 to obtain a set of propositional logic expressions that correspond to constraints that must be satisfied for the corresponding policy statement to be in effect. A first propositional logic expression may be generated from the first set of policy statements and a second propositional logic expression may be generated from the second set of policy statements. The propositional logic expressions may be expressed in a language in accordance with a SMT-LIB standard language such as the STM-LIB 2.0 standard. A satisfiability engine 612 may be used to compare the first propositional logic expression and the second propositional logic expression to determine whether one propositional logic is more permissive than the other.

A satisfiability engine 612 may be used to analyze the permissiveness of two or more propositional logic expressions. The satisfiability engine 612 may be hardware, software, or a combination thereof. In some embodiments, the satisfiability engine 612 allows clients (e.g., internal clients such as the propositional logic translator 610, the policy analyzer service 606, etc.) to determine whether a first propositional logic expression is more permissive than a second propositional logic expression. The satisfiability engine 612 may generate additional propositional logic constraints as part of determining whether the first propositional logic expression is more permissive than the second propositional logic expression.

In some embodiments, the satisfiability engine 612 utilizes the following constraints to determine whether a first policy (e.g., policy A) is more permissive than a second policy (e.g., policy B):

(assert (or policyB.neutral policyB.denies))

(assert policy A.allows)

The constraints may be generated and evaluated in addition to constraints of the first propositional logic expression and the second propositional logic expression, which may be encoded in the manner described above in connection with the discussions of FIG. 6. The constraints may be generated based at least in part on what a client requests. For example, the satisfiability engine 612 may generate constraints that are satisfied only under circumstances where a first policy grants access to a resource and a second policy denies access to the resource or is neutral regarding the resource in response to a request from a caller (e.g., the policy analyzer service 606) to determine whether a first propositional logic expression is more permissive than a second propositional logic expression. Such an embodiment may be implemented in a deny-by-default context where a neutral context (i.e., a context where no permission explicitly grants or denies access to a particular resource). In an allow-by-default context, the satisfiability engine 612 may generate different constraints that are satisfied where the first policy grants access to a resource or is neutral regarding the resource and the second policy does not deny access to the resource.

The satisfiability engine 612 may be used to verify whether the propositional logic constraints (e.g., those obtained from the first and second propositional logic expressions and those generated by the satisfiability engine) are equivalent. In some embodiments, a command may be used to determine whether the set of constraints are satisfiable. A formula may be satisfiable if there is an interpretation that makes all the asserted formulas true. In other words, the model is satisfiable if each of the constraints is satisfied under some conditions. In some embodiments, the satisfiability engine may be implemented at least in part using a satisfiability modulo theories (SMT) constraint solver to determine whether a formula is satisfiable. An example of a SMT-based constraint solver is Z3. Other types of solvers may be utilized in accordance with the techniques described herein as part of implementing a satisfiability engine including but not limited to satisfiability (SAT) solvers and binary decision diagrams (BDD) solvers. The satisfiability engine 612 may generate an equivalence result that indicates whether the formula is satisfiable and, by extension, whether two or more policies are equivalent. In some embodiments, an equivalence result is made available to another computing entity, such as the client computing device 602 that issued a request, a system administrator, and other computing entities.

Figure 7:
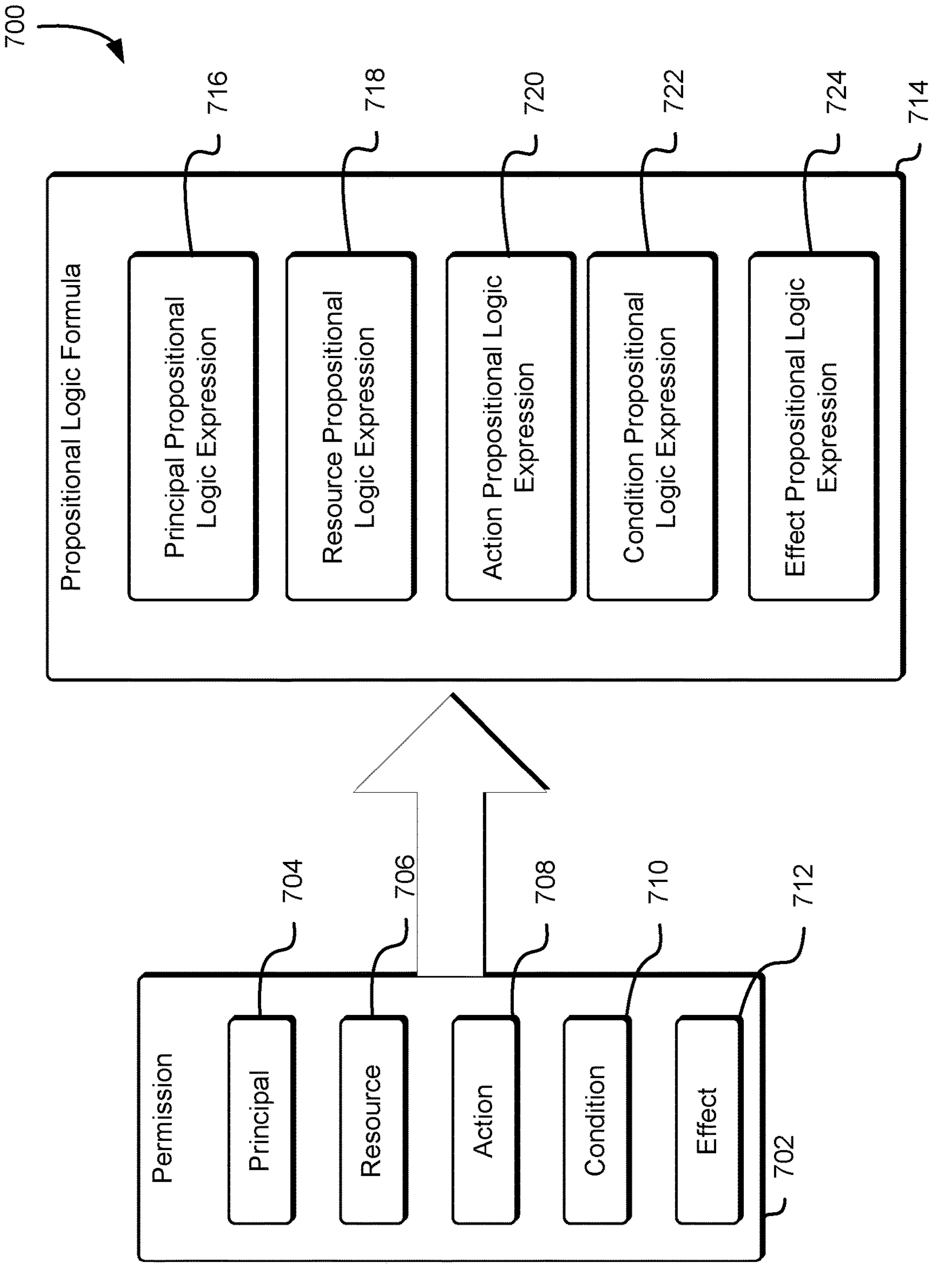
FIG. 7 illustrates an environment in which a computing resource service provider may be utilized to implement various embodiments.

FIG. 7 shows an illustrative example of a diagram 700 in which a security permission and a corresponding propositional logic expression are shown. The permission 702 illustrated in FIG. 7 may be one of a plurality of security permissions specified in a security policy, such as security policies described elsewhere in connection with FIG. 6.

Diagram 700 illustrates an example of a permission 702 which may be associated with a computing resource policy. In some embodiments, a permission 702 may specify a principal 704, a resource 706, an action 708, a condition 710, and an effect 712. In some embodiments, a permission 702 may also specify a plurality of one or more of these elements such as, for example, a set or class of users, a collection of resources, several different actions, and/or multiple conditions. In some embodiments, the permission 702 may specify one or more wildcard or otherwise modifiable characters that may be used to denote that the permission 702 may be modified to make the permission 702 applicable to different users and their associated resources. Wildcards may be represented in various formats—for example, an asterisk may represent any number of characters and a question mark may represent any single character. In some embodiments, the policy may be expressed in a language independent format such as JavaScript Object Notation (JSON). Examples discussed in this disclosure may be in JSON format or in a format similar to JSON and as illustrations of various embodiments which may be implemented. Of course, various other formats which may be utilized in the manner described in connection with JSON and JSON-like formats are also contemplated and within the scope of this disclosure.

The principal 704 may be a user, a group, an organization, a role, or a collection and/or combination of these or other such entities. A principal 704 may be any entity that is capable of submitting API calls that cause an action associated with a resource to be performed and/or any entity to which permissions associated with a resource may be granted. As an example, a permission 702 may have a principal 704 element specified in the following manner:

"Principal": "rn:ws:iam::ducksfan8"

In some embodiments, the principal 704 is identified by a resource name that uniquely identifies the principal 704. A principal 704 may include one or more name spaces that include additional information regarding the principal. For example, "rn" may refer to a resource name prefix and identifies the subsequent information as part of a resource name; "ws" may refer to a partition namespace that the resource is in; "iam" may refer to a service namespace that identifies a service of a computing resource service provider (e.g., the computing resource service provider may provide services related to identity and access management); namespaces may additionally be omitted (note that there are two semicolons in the example above between "iam" and "ducksfan8")—in some formats and/or for some resources, a region namespace may be option; and "ducksfan8" may refer to an identifier for the account, such as the account that owns the resource 706 specified in the permission 702.

The resource 706 may refer to a computing resource of a computing resource service provider. Computing resources of a computing resource service provider may include: compute resources (e.g., virtual machine instances); storage resources (e.g., scalable storage, block storage, and managed file storage systems); database systems (e.g., managed relational database systems); migration services (e.g., applications, services, and hardware for streamlining the transfer of data from one physical data center to another); network and content delivery; developer tools; management tools; security, identity, and access management services; analytics services; artificial intelligence services; and more. Computing resources 706 may be organized in a hierarchy, and may use structures such as folders, directories, buckets, etc. to organize sets of computing resources into groupings. In some cases, policies and/or permissions may be applied directly to a bucket and grant cross-account access to an environment. As an example, a permission 702 may have a resource 706 element specified in the following manner:

"Resource": "rn:ws:storage:::bucket/MM4_ Heisman.png"

In some embodiments, the resource 706 is identified by a resource name that uniquely identifies the resource 706. In some cases, the resource 706 may share a same naming convention as the principal 704 or other elements of the permission. However, this need not be the case, as each separate element of a permission 702 may use a naming convention, namespace, format, etc. that is independent of other elements. In the example resource given above, "rn" may refer to a resource name prefix and identifies the subsequent information as part of a resource name; "ws" may refer to a partition namespace that the resource is in; "storage" my refer to a service namespace that identifies a service of a computing resource service provider (e.g., the computing resource service provider may provide services related to object-based storage); as discussed elsewhere, namespaces may be omitted in some cases—for example, a region namespace and/or account namespace may be omitted; and a resource which may also include an indicator of the type of resource. In the example above, the resource may indicate an image in the Portable Network Graphics (PNG) format and is stored in a bucket.

The action 708 may be the specific action or actions that will be allowed or denied by the permission. Different types of services (e.g., having different service namespaces) may support different actions. For example, an identity and account management service may support an action for changing passwords, and a storage service may support an action for deleting objects. An action may be performed in association with the resource and may, for example, be identified by a type of API call, a library call, a program, process, series of steps, a workflow, or some other such action. As an example, a permission 702 may have an action 708 element specified in the following manner:

"Action": "storage:GetObject"

In this example, the action that is allowed or denied (determined based on the effect 712 specified in the permission) corresponds to a storage service that supports an action (e.g., API call) for GetObject, which may be used in connection with obtaining an object and/or access to an object of a storage service. As discussed elsewhere, various namespaces may be used in connection with specifying an action. Wildcards may be used to specify multiple actions. For example, an action element described as "Action": "storage:*" may refer to all APIs supported by a storage service. As a second example, an action element described as "Action": "iam:*AccessKey*" may refer to actions supported by an identity and access management service in connection with access keys of a service—illustrative examples may include actions related to creating an access key (e.g., a "CreateAccessKey" action may exist), deleting an access key (e.g., "DeleteAccessKey"), listing access keys (e.g., "ListAccessKeys"), and updating an existing access key (e.g., "UpdateAccessKey").

The condition 710 element may be one or more conditions that specify when a policy is in effect. In some embodiments, the condition element is optional and may be omitted in some permissions. Conditions may be described as Boolean expressions that may be used to determine whether the policy is in effect (i.e., if the expression evaluates to TRUE) or not in effect (i.e., if the expression evaluates to FALSE). Policies that are not in effect may be unenforced or ignored by an authorization module (such as those described elsewhere in this). In some embodiments, conditions in a permission may be evaluated against values provided as part of a web API request corresponding to one or more APIs specified in the action 708 element. As an example, a permission 702 may have a condition 710 element specified in the following manner:

"Condition": {"DateLessThan": {"ws:CurrentTime": "2014-12-13"}}

In this example, the condition, the "ws: CurrentTime" value of the request is compared against a literal value "2604-12-13" using the condition operator "DateLessThan" which may be used to evaluate whether the condition is met. In this example, the condition may be true when the current time (e.g., the time the request is received by the service provider) is less than the supplied date of Dec. 13, 2014. It should be noted that the key value (in the example, the current time) may be compared not only against literal values, but policy variables as well. Various other types of condition operators may exist, which may be used for comparing string conditions, numeric conditions, Boolean conditions, binary conditions (e.g., testing values in binary format), IP address conditions (e.g., testing values against a specific IP address or range of IP addresses), and more. Conditions may, furthermore, include quantifiers. For example, a string condition may include an operator such as "StringEquals" that compares whether two strings are equal, and a similar operator may include a quantifier such that "StringEqualsIfExists" may be used to compare two strings when the key value exists in the context of an evaluation. Quantifiers may be used in conjunction with wildcards where multiple resources matching a wildcard expression may support different context keys. Such an example is discussed below in connection with FIGS. 10-16. In some embodiments, such as those where conditions include quantifier, first-order logic may be utilized rather than propositional logic.

An effect 712 may refer to whether the permission 702 is used to grant or deny access to the computing resources specified in the permission 702 in the resource 706 element. An effect 712 may be an ALLOW effect, which grants access to a resource, and a DENY effect, which denies access to a resource. In some embodiments, access to computing resources of a computing resource service provider are denied by default and a permission affirmatively including an ALLOW effect is required. As an example, a permission 702 may have an effect 712 element specified in the following manner:

"Effect": "ALLOW"

Accordingly, a permission statement that grants a particular principal (e.g., "rn:ws:iam::ducksfan8") access to call a storage service API (e.g., "storage: GetObject") and obtain a particular image (e.g., "rn:ws:storage:::bucket/MM4_Heisman.png") when a specific condition is true (e.g., the API request is made prior to Dec. 13, 2016) may be specified in the following manner:

```
"Statement": [
  {
    "Effect": "ALLOW",
    "Principal": "rn:ws:iam::ducksfan8",
    "Action": "storage: GetObject",
    "Resource": "rn:ws:storage:::bucket/
      MM4_Heisman.png",
    "Condition": {
      "DateLessThan": {
        "ws: CurrentTime": "2014-12-13"
      }
    }
  }
]
```

It should be noted that the examples described above merely described one of many ways in which permissions may be expressed. Of course, in other embodiments, variations on the principles described above in connection with FIG. 7 may be applied in various ways.

In some embodiments, elements may be described in inverse (e.g., negative) terms. An inverse element may be applied to all matches except for those specified in the element. For example, if a permission statement is described as "NotPrincipal: ducksfan8" then the permission statement applies to all principals except the particular principal or principals listed in the permission statement—in this case, the permission statement would apply to all principals except ducksfan8. An inverse element may be used in conjunction with the principal element (e.g., a "NotPrincipal" element would apply to all principals except those listed), the action element (e.g., a "NotAction" element would apply to all actions except those listed), the resource element (e.g., a "NotResource" element would apply to all resources except those listed), and so on.

As shown in FIG. 7, a permission 702 may be used to generate a propositional logic expression 714. A propositional logical expression 714 may comprise a set of logical expressions which represent the permission 702. Propositional logical expressions may be evaluated to determine whether a formula is satisfiable. For example, propositional logic may be used to determine whether it is satisfiable that a resource is allowed under a first propositional logical expression corresponding to a first security policy comprising a first set of permissions and the resource is not allowed (e.g., explicitly denied and/or not explicitly granted an ALLOW effect) under a second propositional logical expression corresponding to a second security policy comprising a second set of permissions. In some embodiments, the permission 702 statement may be used to generate a propositional logic expression 714. The principal 704 element may map to a principal propositional logic expression 716 which may comprise of statements in propositional logic and one or more assertions that are used as constraints on whether a formula is satisfiable. An example of this mapping is described below in connection with FIGS. 10-16. Likewise, the resource 706 element may map to a resource propositional logic expression 718, the action 708 element may map to an action propositional logic expression 720, the condition 710 element may map to a condition propositional logic expression 722, and the effect 712 element may map to an effect propositional logic expression 724. Various examples in connection with these mappings are described below in connection with FIGS. 10-16.

Figure 8:
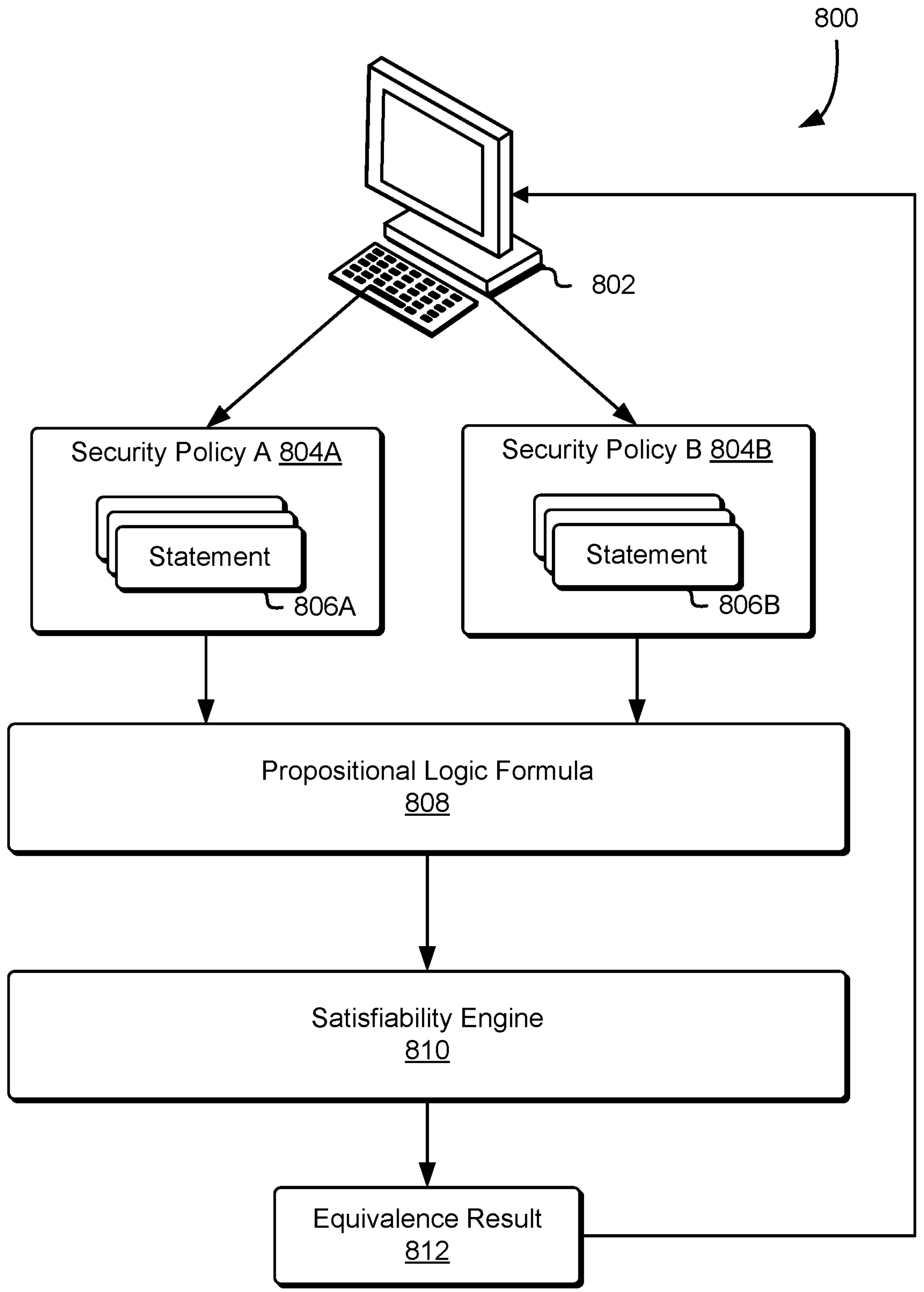
FIG. 8 illustrates an environment in which a client issue a request to analyze the equivalency of two security policies and receive an equivalence result.

FIG. 8 is an illustrative example of an environment 800 in which various embodiments of the present disclosure can be practiced. The environment 800 illustrates an example in which a client may issue a request to analyze the equivalency of two security policies and receive an equivalence result that indicates whether the policies are equivalent. The environment 800 may utilize components described elsewhere in this disclosure, such as components described in connection with FIGS. 6, 7, and 9.

In some embodiments, a client computing device 802 such as those described elsewhere in connection with FIG. 6 may issue a request on behalf of a client to determine the equivalency between two security policies. In some embodiments, the request is a web API request that encodes the security policies that are to be analyzed as part of the request. However, this need not be so—in some embodiments, the security client computing device may provide a reference to one or more security policies that the recipient of the request may use to obtain the one or more security policies. In some embodiments, a web API request is transmitted from the client computing device to a computing resource service provider in accordance with those described in connection with FIG. 9. The request may be fulfilled by a policy analyzer service, such as those described in connection with FIGS. 6 and 9. A first security policy 804A may be parsed to obtain one or more permission statements 806A and the permissions statements 806 may be translated to a first portion of the propositional logic expression 808 which may act as constraints on a propositional logic formula. Likewise, a second security policy 804B may be parsed to obtain one or more permission statements 806B and the permissions statements 806 may be translated to a second portion of the propositional logic expression 808 which may act as constraints on a propositional logic formula. A system (e.g., a policy analyzer service or a component therein) may utilize a satisfiability engine 810, such as those described in connection with FIG. 6, to determine whether the two propositional logic expressions are equivalent, if one is more permissive than the other, and more.

The determination may be made in accordance with techniques described elsewhere in this disclosure. In some embodiments, an equivalence result 812 may indicate that two policies are equivalent. Two policies may be said to be equivalent if the security permissions from the first policy and the second policy apply in the same manner to all actions, resources, and principals—in other words, for any given set of actions, resources, and principals, that the first policy and the second policy will both either deny access (either explicitly based on a denial statement or implicitly based on the lack of a permission granting access) or both will grant access—it will not be the case that one policy grants access and the other denies access. In the case that one policy is determined to be more permissive than another policy, it will be the case that one policy grants access under a set of parameters where another policy denies access.

In some embodiments, the equivalence result 812 may be transmitted to the client computing device 802 as a response to a web API request. In some embodiments, the equivalence result 812 may encode the permissiveness result (e.g., whether one policy was more permissive than a second policy). In some embodiments, other information is provided either in place of or in addition to the permissiveness result. For example, in the case where a first policy is more permissive than a second policy, the equivalence result 812 may encode a set of parameters that results in a grant of access by the first policy and a denial of access by the second policy (e.g., a principal, resource, and action may be encoded in the response such that a first policy will grant access to the principal to perform the action on the resource and the second policy will deny access to the principal from performing the action on the resource).

The environment 800 may be used to implement various embodiments. In some embodiments, a computing device may make a request to determine whether a policy (e.g., encoded in the request) complies with a set of minimum security standards. A computing resource service provider may receive the request, route, obtain a security policy associated with security standards, and determine the relative permissiveness of the provided policy and the security standard policy. If the provided policy is more permissive than the security standard, a response may indicate that the policy does not comply with the security standard. For example, in some embodiments, a client may attempt to set a security policy using a policy management service such as those described elsewhere in connection with FIG. 9. The policy management service may utilize a policy analyzer service to determine whether the client's security policy complies with one or more security standards. If the policy does not comply, then the policy management service may refuse to fulfill the request and indicate to the client that the request was not fulfilled and may encode that the security policy was more permissive than one or more security standard policies.

FIG. 9 is an illustrative example of an environment 900 in which a distributed computer system may utilize the various techniques described herein. In an embodiment, a principal 902 may use a computing device to communicate over a network 904 with a computing resource service provider 906. Communications between the computing resource service provider 906 and the principal 902 may, for instance, be for the purpose of accessing a service 908 operated by the computing resource service provider 906, which may be one of many services operated by the computing resource service provider 906. The service 908 may comprise a service frontend 910 and a service backend 914. The principal 902 may, through an associated computing device, issue a request for access to a service 908 (and/or a request for access to resources associated with the service 908) provided by a computing resource service provider 906. The request may be, for instance, a web service application programming interface request. The principal may be a user, or a group of users, or a role associated with a group of users, or a process representing one or more of these entities that may be running on one or more remote (relative to the computing resource service provider 906) computer systems, or may be some other such computer system entity, user, or process. Each user, group, role, or other such collection of principals may have a corresponding user definition, group definition, role definition, or other definition that defines the attributes and/or membership of that collection. For example, a group may be a group of principals that have the same geographical location. The definition of that group of principals may include the membership of the group, the location, and other data and/or metadata associated with that group. As used herein, a principal is an entity corresponding to an identity managed by the computing resource service provider, where the computing resource service provider manages permissions for the identity and where the entity may include one or more sub-entities, which themselves may have identities.

The principal 902 may communicate with the computing resource service provider 906 via one or more connections (e.g., transmission control protocol (TCP) connections). The principal 902 may use a computer system client device to connect to the computing resource service provider 906. The client device may include any device that is capable of connecting with a computer system via a network, such as example devices discussed below. The network 904 may include, for example, the Internet or another network or combination of networks discussed below.

The computing resource service provider 906, through the service 908, may provide access to one or more computing resources such as virtual machine (VM) instances, automatic scaling groups, file-based database storage systems, block storage services, redundant data storage services, data archive services, data warehousing services, user access management services, identity management services, content management services, and/or other such computer system services. Other example resources include, but are not limited to user resources, policy resources, network resources and/or storage resources. In some examples, the resources associated with the computer services may be physical devices, virtual devices, combinations of physical and/or virtual devices, or other such device embodiments.

The request for access to the service 908 may be received by a service frontend 910, which, in some examples, comprises a web server configured to receive such requests and to process them according to one or more policies associated with the service 908. The request for access to the service 908 may be a digitally signed request and, as a result, may be provided with a digital signature. In some embodiments, the web server employs techniques described herein synchronously with processing the requests. The service frontend 910 may then send the request and the digital signature for verification to an authentication service 916. The authentication service 916 may be a stand-alone service or may be part of a service provider or other entity. The authentication service 916, in an embodiment, is a computer system configured to perform operations involved in authentication of principals.

Upon successful authentication of a request, the authentication service 916 may then obtain policies applicable to the request. A policy may be applicable to the request by way of being associated with the principal 902, a resource to be accessed as part of fulfillment of the request, a group in which the principal 902 is a member, a role the principal 902 has assumed, and/or otherwise. To obtain policies applicable to the request, the authentication service 916 may transmit a query to a policy repository 918 managed by a policy management service 920. The query to the policy repository 918 may be a request comprising information sufficient to determine a set of policies applicable to the request. The query to the policy repository may, for instance, contain a copy of the request and/or contain parameters based at least in part on information in the request, such as information identifying the principal, the resource, and/or an action (operation to be performed as part of fulfillment of the request).

A policy management service 920 may provide access to, and administration of, policies applicable to requests for access to computing resources (e.g., web service application programming interface requests). For example, the policy management service may receive information sufficient for selecting policies applicable to pending requests. In some embodiments, the information may be copies of the requests, or may be information generated based at least in part on the requests. For example, a service such as a service frontend 910 may receive a request for access to resources and may generate a query to the policy management service based at least in part on information specified by the request.

Having obtained any policies applicable to the request, the authentication service 916 may provide an authentication response and, if applicable, the obtained policies back to the service frontend 910. The authentication response may indicate whether the response was successfully authenticated. The service frontend 910 may then check whether the fulfillment of the request for access to the service 908 would comply with the obtained policies using an authorization module 912. Note that, in some embodiments, a policy may be configured such that, whether fulfillment of a request violates the policy depends on whether a violation of a uniqueness constraint has occurred. For instance, some data may be considered to be less sensitive than other data and requests for the less sensitive data may be fulfilled despite a detected violation of a uniqueness constraint while access to the more sensitive data may require that a uniqueness constraint violation not have occurred in connection with a public key specified to be used in authentication of requests. Similar techniques may be employed for other types of computing resources, such as computing devices, storage locations, collections of data, identities, policies, and the like.

An authorization module 912 may be a process executing on the service frontend that is operable to compare the request to the one or more permissions in the policy to determine whether service may satisfy the request (i.e., whether fulfillment of the request is authorized). For example, the authorization module may compare an API call associated with the request against permitted API calls specified by the policy to determine if the request is allowed. If the authorization module 912 is not able to match the request to a permission specified by the policy, the authorization module 912 may execute one or more default actions such as, for example, providing a message to the service frontend that causes the service frontend to deny the request, and causing the denied request to be logged in the policy management service 920. If the authorization matches the request to one or more permissions specified by the policy, the authorization module 912 may resolve this by selecting the least restrictive response (as defined by the policy) and by informing the service frontend whether the fulfillment of the request is authorized (i.e., complies with applicable policy) based on that selected response. The authorization module 912 may also by select the most restrictive response or may select some other such response and inform the service frontend whether the fulfillment of the request is authorized based on that selected response. Note that, while FIG. 9 shows the authorization module 912 as a component of the service frontend 910, in some embodiments, the authorization module 912 is a separate service provided by the computing resource service provider 906 and the frontend service may communicate with the authorization module 912 over a network.

Finally, if the fulfillment of the request for access to the service 908 complies with the applicable obtained policies, the service frontend 910 may fulfill the request using the service backend 914. A service backend 914 may be a component of the service configured to receive authorized requests from the service frontend 910 and configured to fulfill such requests. The service frontend 910 may, for instance, submit a request to the service backend to cause the service backend 914 to perform one or more operations involved in fulfilling the request. In some examples, the service backend 914 provides data back to the service frontend 910 that the service frontend provides in response to the request from the principal 902. In some embodiments, a response to the principal 902 may be provided from the service frontend 910 indicating whether the request was allowed or denied and, if allowed, one or more results of the request. The policy analyzer service 922 may be in accordance with those described elsewhere in this disclosure, and requests from a client such as the principal 902 may be routed to the policy analyzer service 922 via the service frontend 910. The policy analyzer service 922 may have access to policies via the policy management service 920.

Figure 10:
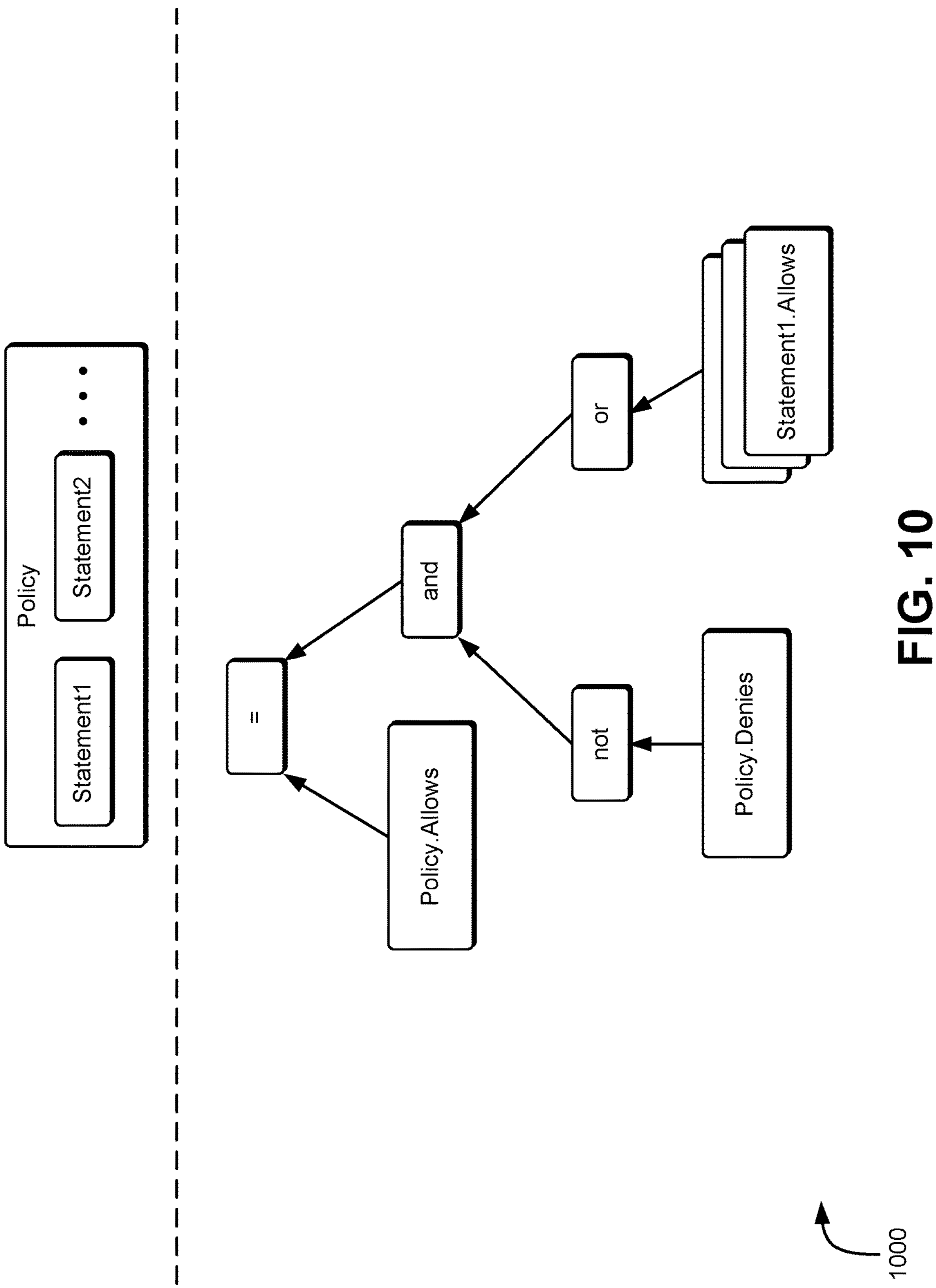
FIG. 10 illustrates a diagram in which propositional logic is used as part of determining satisfiability of a propositional logic formula.

FIG. 10 shows an illustrative example of a diagram 1000 in which propositional logic is used as part of determining satisfiability of a propositional logic formula based at least in part on a policy. The diagram 1000 illustrates an example policy 1002 which may be in accordance with those described elsewhere in this disclosure, such as in connection with FIGS. 6-9. The diagram 1000 illustrates an aspect in which propositional logic (shown below the dotted lines) is used to determine whether the policy 1002 is satisfiable. The policy 1002 may include one or more policy statements that may be constraints on the propositional logic. An example policy statement (e.g., a permission statement) is described elsewhere in this disclosure in connection with FIG. 9.

The diagram 1000 illustrates a propositional logic that may be used in part to determine whether the policy 1002 is satisfiable. In the diagram 1000, the propositional logic illustrates a constraint used in part to determine satisfiability of a policy. In particular, the diagram 1000 illustrates a constraint that what the policy allows must be equivalent to what was not explicitly denied by the policy and is allowed by any of the one or more statements of the policy. In some embodiments, the propositional logic may be expressed in accordance with the SMT language which may be in accordance with one or more SMT-LIB standards. Other formats may be used to describe propositional logics, such as CVC language and Center for Discrete Mathematics and Theoretical Computer Science (DIMACS) formats. The SMT-LIB standard: version 2.5, SMT-LIB standard version 2.0, SMT-LIB standard version 1.2, and SMT-LIB standard version 1.0 are hereby incorporated by reference.

For example, an implementation in accordance with STM-LIB standard v2.0 may include constraints as described above in the following form:

(assert (=policy A.allows (and (not policyA.denies) (or policy A.statement0.allows policyA.statement1.allows policy A.statement2.allows . . . ))))

It should be noted that, here and elsewhere, the examples are given to illustrate concepts for how to implement various embodiments in accordance with the teachings of this disclosure. For instance, in the example above, the ellipses are used to illustrate that a policy with more than two permission statements will have more constraints that are connected using OR statements. It should be noted that propositional logics may be expressed using Polish notation (i.e., prefix notation) in various embodiments such as those in accordance with various STM-LIB standards.

Figure 11:
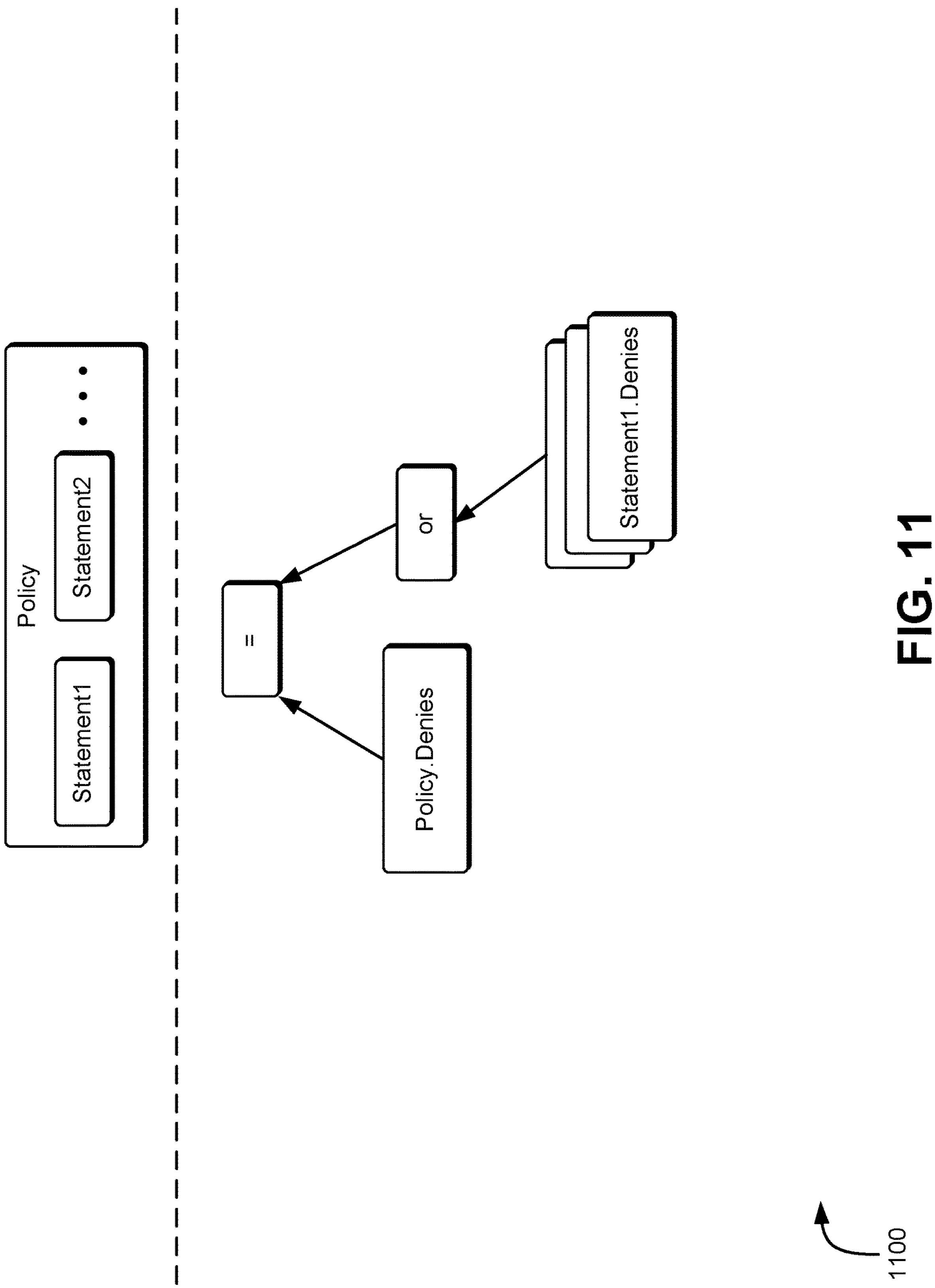
FIG. 11 illustrates a diagram in which propositional logic is used as part of determining satisfiability of a propositional logic formula.

FIG. 11 shows an illustrative example of a diagram 1100 in which propositional logic is used as part of determining satisfiability of a propositional logic formula based at least in part on a policy. The diagram 1100 illustrates an example policy 1102 which may be in accordance with those described elsewhere in this disclosure, such as in connection with FIGS. 6-10. The diagram 1100 illustrates an aspect in which propositional logic (shown below the dotted lines) is used to determine whether the policy 1102 is satisfiable. The policy 1102 may include one or more policy statements that may be constraints on the propositional logic. An example policy statement (e.g., a permission statement) is described elsewhere in this disclosure in connection with FIG. 7.

The diagram 1100 illustrates a propositional logic that may be used in part to determine satisfiability of a propositional logic formula based at least in part on a policy. In the diagram 1100, the propositional logic illustrates a constraint used in part to determine satisfiability of a policy. In particular, the diagram 1100 illustrates a constraint that what the policy denies must be equivalent to what is denied by any of the one or more statements of the policy. In some embodiments, the propositional logic may be expressed in accordance with the SMT language which may be in accordance with one or more SMT-LIB standards. Other formats may be used to describe propositional logics, such as CVC language and Center for Discrete Mathematics and Theoretical Computer Science (DIMACS) formats.

For example, an implementation in accordance with STM-LIB standard v2.0 may include constraints as described above in the following form:

(assert (=policyA.denies (or policy A.statement0.denies policy A.statement1.denies policy A.statement2.denies . . . )))

In other words, constraint provided by the example above is such that what a policy (e.g., policyA) denies is equivalent to what any individual statement (e.g., statement1, statement2, statement3, and so on) denies.

Figure 12:
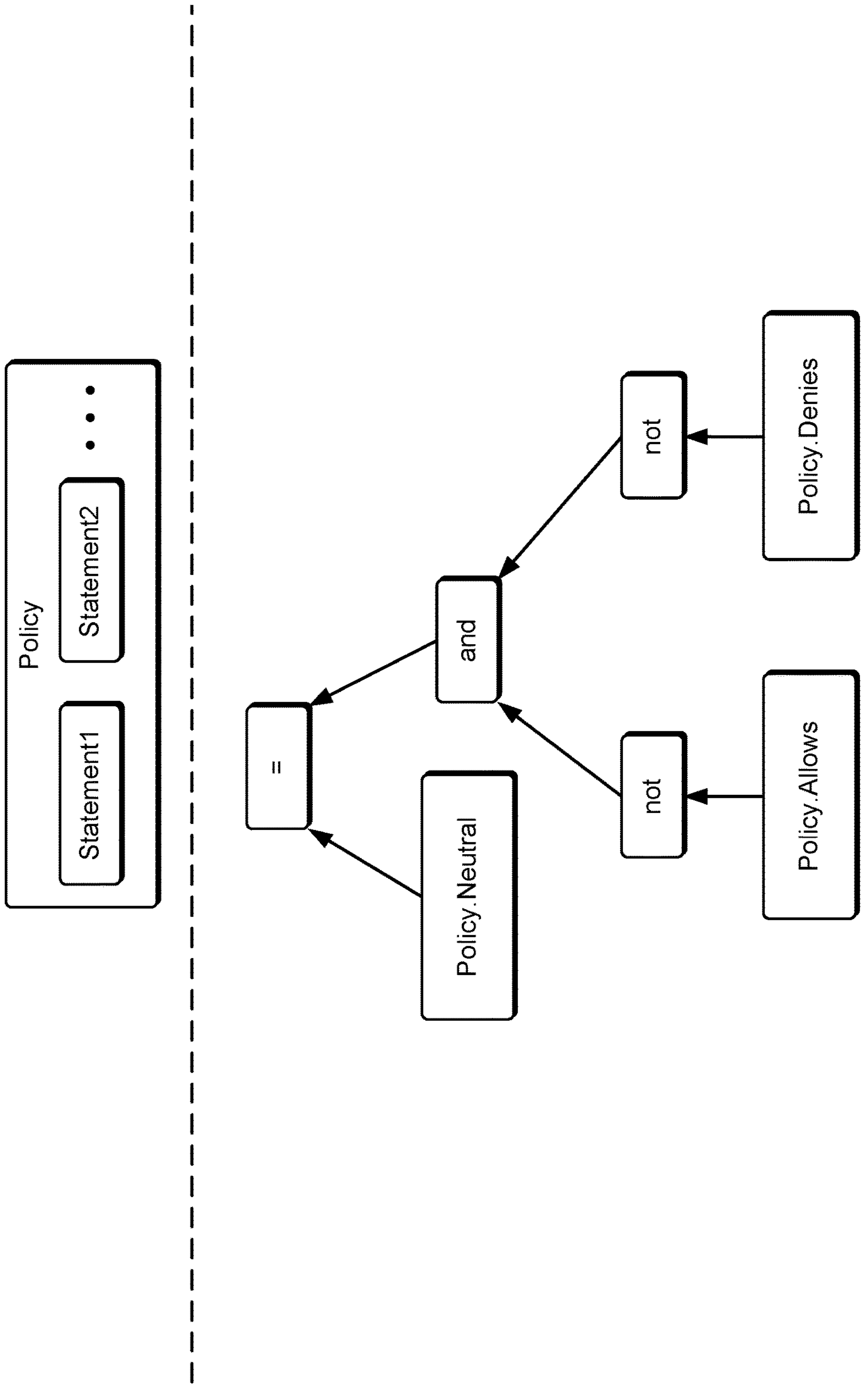
FIG. 12 illustrates a diagram in which propositional logic is used as part of determining satisfiability of a propositional logic formula.

FIG. 12 shows an illustrative example of a diagram 1200 in which propositional logic is used as part of determining satisfiability of a propositional logic formula based at least in part on a policy. The diagram 1200 illustrates an example policy 1202 which may be in accordance with those described elsewhere in this disclosure, such as in connection with FIGS. 6-11. The diagram 1200 illustrates an aspect in which propositional logic (shown below the dotted lines) is used to determine whether the policy 1202 is satisfiable. The policy 1202 may include one or more policy statements that may be constraints on the propositional logic An example policy statement (e.g., a permission statement) is described elsewhere in this disclosure in connection with FIG. 7.

The diagram 1200 illustrates a propositional logic that may be used in part to determine satisfiability of a propositional logic formula based at least in part on a policy. In the diagram 1200, the propositional logic illustrates a constraint used in part to determine satisfiability of a policy. In particular, the diagram 1200 illustrates a constraint that what the policy is neutral towards must be equivalent to what is not allowed by the policy and what is not denied by the policy. In some embodiments, the propositional logic may be expressed in accordance with the SMT language which may be in accordance with one or more SMT-LIB standards. Other formats may be used to describe propositional logics, such as CVC language and Center for Discrete Mathematics and Theoretical Computer Science (DIMACS) formats.

For example, an implementation in accordance with STM-LIB standard v2.0 may include constraints as described above in the following form:

(assert (=p0.neutral (and (not p0.allows) (not p0.denies))))

In other words, constraint provided by the example above is such that what a policy (e.g., policyA) is neutral towards is equivalent to what was not allowed by the policy and what was not denied by the policy.

In connection with the discussion regarding FIGS. 10-12, the constraints described may be used in combination to define the constraints for a policy (e.g., policyA), which may be described in the following form:

```
"Statement": [
    {
        "Effect": "ALLOW",
        "Principal": "*",
        "Action": "*",
        "Resource": "*"
    }
]
```

Similarly, the constraints for a second policy (i.e., policyB) may be described in the following form:

```
"Statement": [
    {
        "Effect": "ALLOW",
        "Principal": "*",
        "Action": "sns:*"
        "Resource": "*"
    },
    {
        "Effect": "ALLOW",
        "Principal": "*",
        "NotAction": "sns:Delete",
        "Resource": "*"
    }
]
```

Accordingly, in addition to these constraints, additional constraints may be utilized to determine whether one policy is more permissive than another policy. For example, given two policies (e.g., policy A and policyB of the examples above), the following constraints may be used to determine whether a first policy (i.e., policyA) is more permissive than a second policy (i.e., policyB):

(assert (or pB.neutral pB.denies))

(assert pA.allows)

In various embodiments, a policy analyzer service may be utilized to determine that the above policies (policyA and policyB described above) are equivalent.

In some embodiments, such as those that implementing a deny-by-default system, an authorization module denies access to any resources of a computing resource service provider which a requestor (e.g., a principal) is not explicitly granted access to (e.g., via a permission statement affirmatively allowing access to the resource).

For example, an implementation in accordance with STM-LIB standard v2.0 may include constraints as described above in the following form:

(assert (=p0.neutral (and (not p0.allows) (not p0.denies

In other words, constraint provided by the example above is such that what a policy (e.g., policyA) is neutral towards is equivalent to what was not allowed by the policy and what was not denied by the policy.

Figure 13:
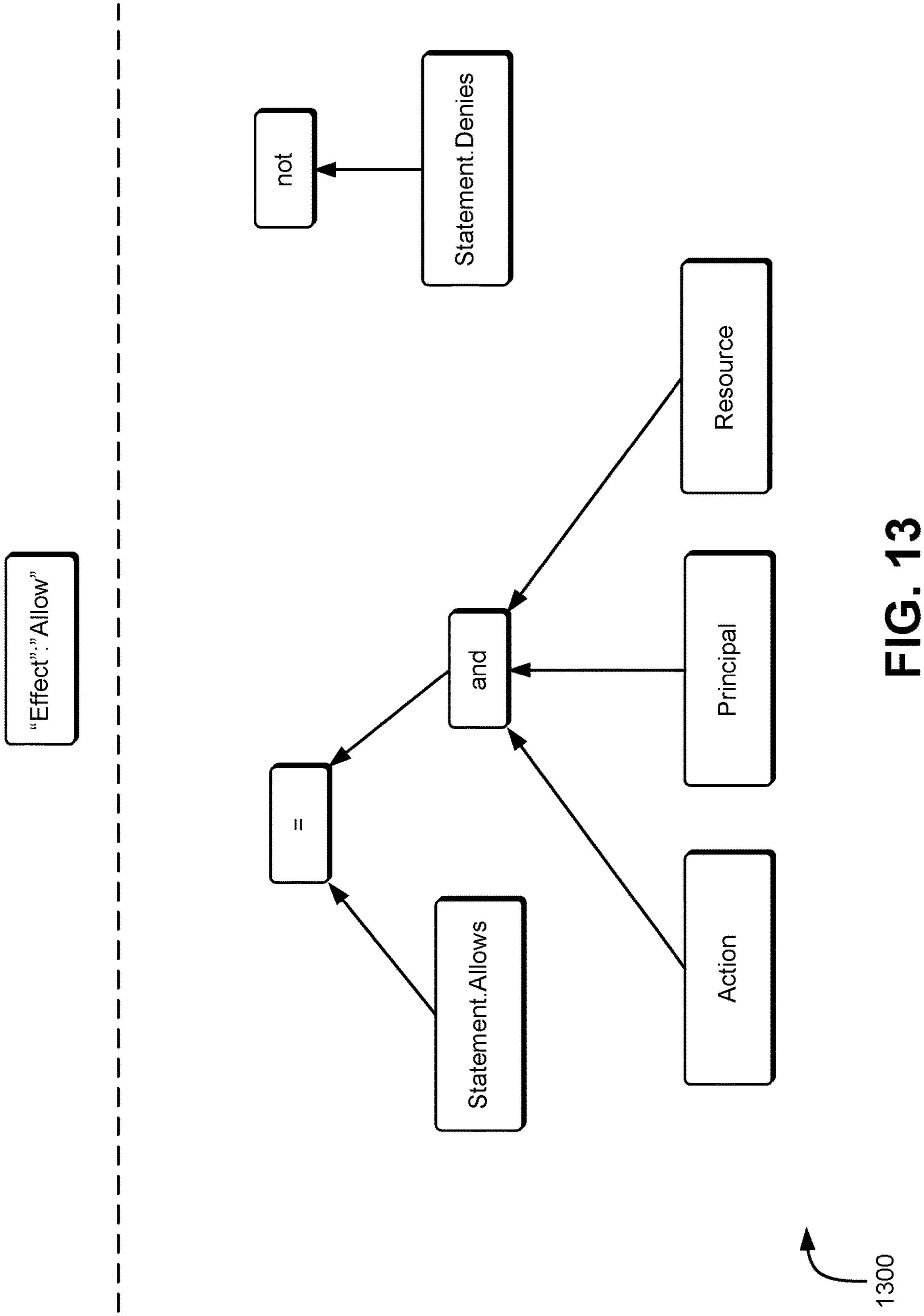
FIG. 13 illustrates a diagram in which propositional logic is used as part of determining satisfiability of a propositional logic formula.

FIG. 13 shows an illustrative example of a diagram 1300 where an element (e.g., as part of a policy) is translated to a propositional logic. The translation may be performed by any suitable component, such as propositional logic translators discussed in connection with FIG. 6. The diagram 1300 illustrates an example where a JSON element (shown above the dotted line) is translated to a propositional logic (shown below the dotted line). The propositional logic may be expressed in accordance with the SMT language which may be in accordance with one or more SMT-LIB standards.

As an example, an effect element of a permission statement that allows access to some resources (e.g., specified elsewhere in the permission statement) may be expressed as a propositional logic with the following constraints:

(assert (=policy.statement.allows (and policy.action policy.resource policy.principal)))

(assert (not policy.statement.denies))

In other words, an allow effect generates propositional logic two constraints-a first constraint that the policy statement has an allow effect and that the action, resource, and principal constraints are satisfied; and a second constraint that the policy statement does not have a deny effect. The action, resource, and principal constraints may be in accordance with those described in connection with FIGS. 13-16. The constraints may also differ depending on what elements are included in the permission statement. For example, if a permission statement includes a condition, the constraint may further include that the condition be satisfied for the constraint to be satisfied. In some embodiments, at least one of the action, resource, and principal elements is a required element of the permission statement such that a valid policy statement must have at least one of the action, resource, and principal elements.

Figure 14:
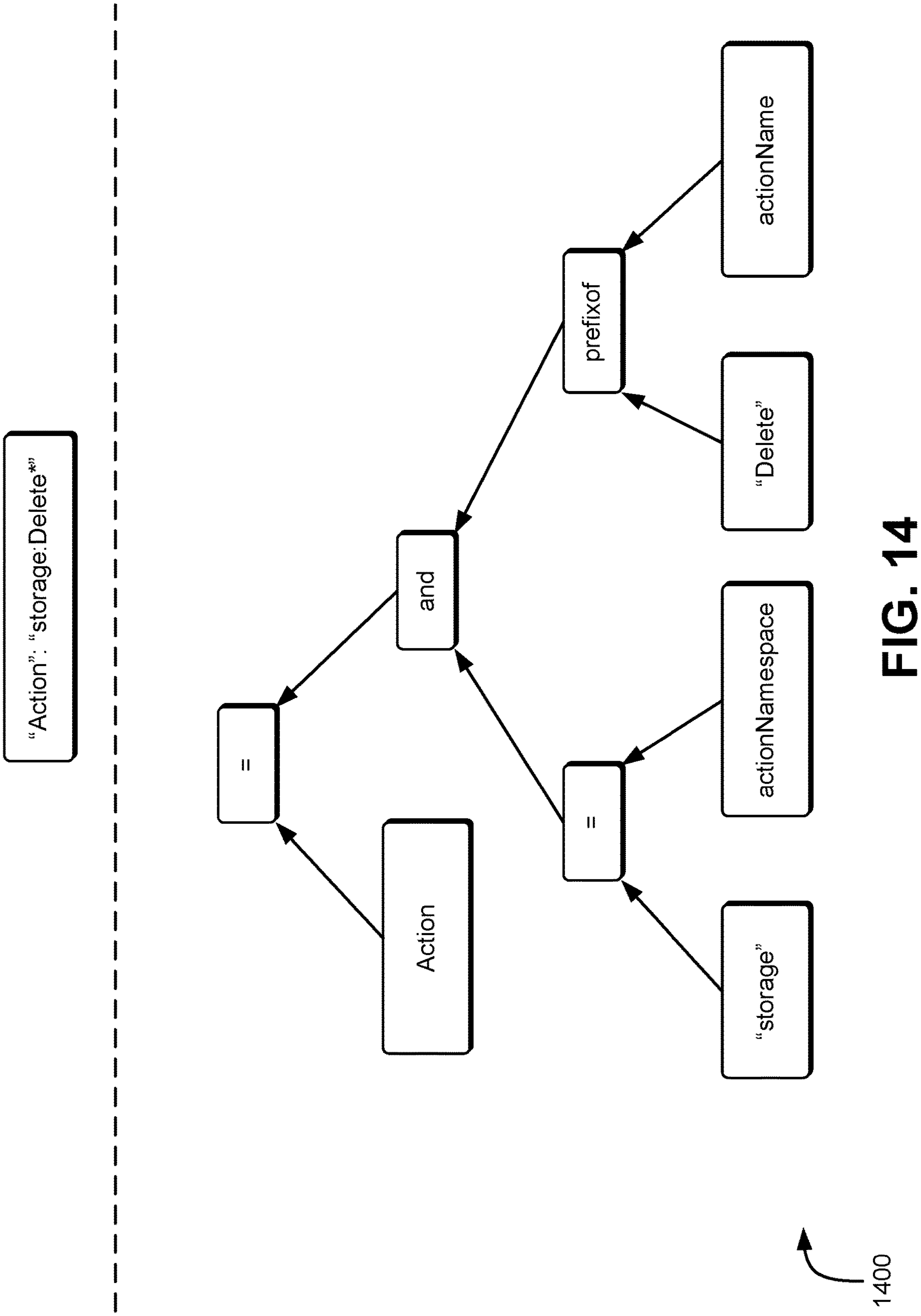
FIG. 14 illustrates a diagram in which propositional logic is used as part of determining satisfiability of a propositional logic formula.

FIG. 14 shows an illustrative example of a diagram 1400 where an element (e.g., as part of a policy) is translated to a propositional logic. The translation may be performed by any suitable component, such as propositional logic translators discussed in connection with FIG. 6. The diagram 1400 illustrates an example where a JSON element (shown above the dotted line) is translated to a propositional logic (shown below the dotted line). The propositional logic may be expressed in accordance with the SMT language which may be in accordance with one or more SMT-LIB standards.

As an example, an action element of a permission statement that grants or denies (depending on the effect element of the permission statement) access to some resources (e.g., specified elsewhere in the permission statement) may be expressed as a propositional logic with the following constraints:

(assert (=policy.action (or (and (="storage" actionNamespace) (str.prefixof "Delete" actionName)))))

In other words, the action element above the dotted line in the diagram 1400 may be translated to a propositional logic having a constraint that is satisfied when the action has a "storage" namespace and an action name that has a string prefix of "Delete" such as "DeleteObject" or "DeleteAllObjects" or "DeleteContainer" and so on. In some embodiments, various string evaluation functions may be used as part of a constraint, such as evaluating string prefixes, suffixes, lengths, substrings (e.g., whether a certain string is included as part of a second string)., and so on. Comparison of strings may further include additional comparison parameters such as making case insensitive comparisons, ignoring symbols and punctuations, ignoring diacritics, ignoring differences between hiragana and katakana characters, and so on. The effect, action, resource, and principal constraints may be in accordance with those described in connection with FIGS. 13-16. The constraints may also differ depending on what elements are included in the permission statement. For example, if a permission statement includes a condition, the constraint may further include that the condition be satisfied for the constraint to be satisfied. In some embodiments, at least one of the effect, action, resource, and principal elements is a required element of the permission statement such that a valid policy statement must have at least one of the effect, action, resource, and principal elements.

Figure 15:
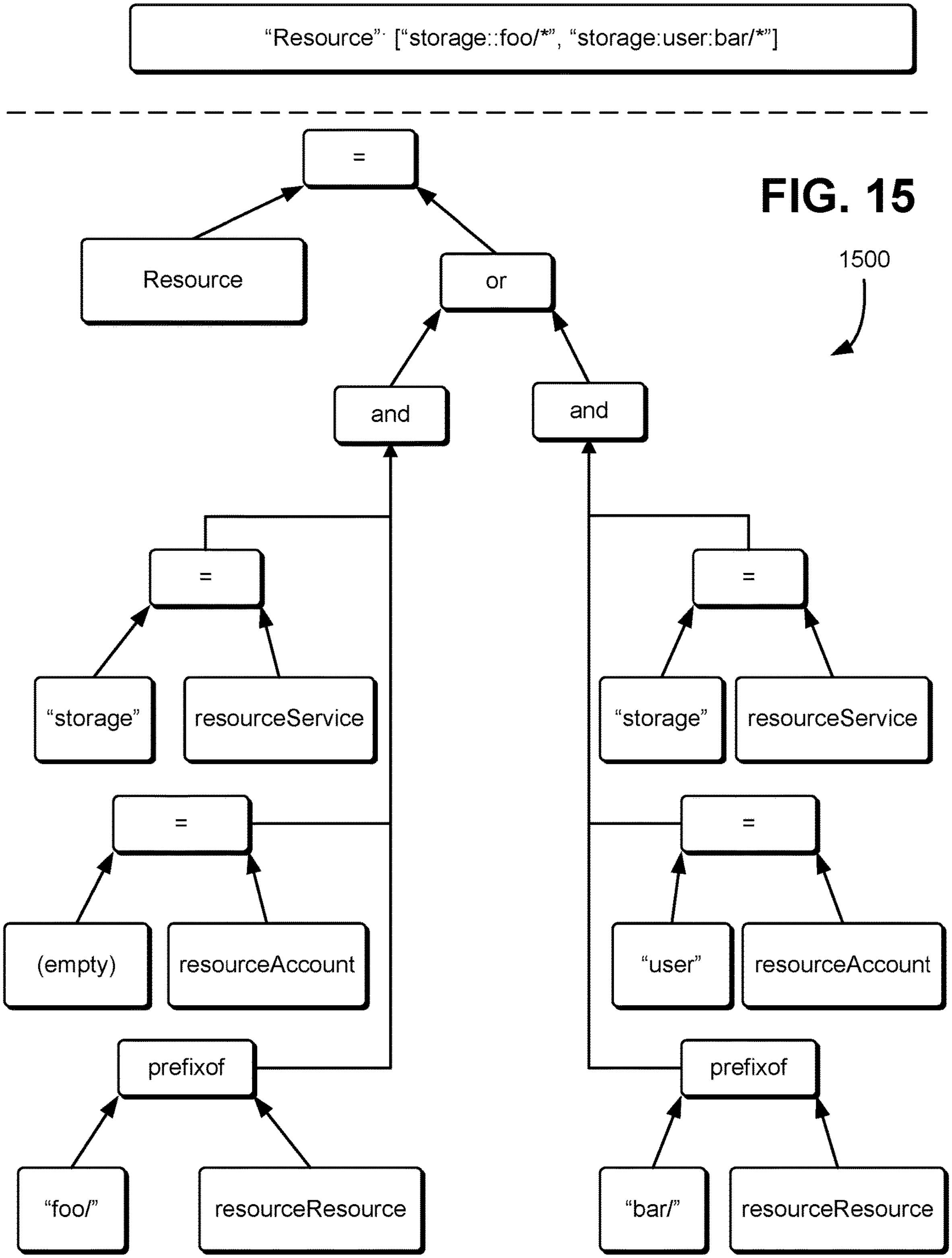
FIG. 15 illustrates a diagram in which propositional logic is used as part of determining satisfiability of a propositional logic formula.

FIG. 15 shows an illustrative example of a diagram 1500 where an element (e.g., as part of a policy) is translated to a propositional logic. The translation may be performed by any suitable component, such as propositional logic translators discussed in connection with FIG. 6. The diagram 1500 illustrates an example where a JSON element (shown above the dotted line) is translated to a propositional logic (shown below the dotted line). The propositional logic may be expressed in accordance with the SMT language which may be in accordance with one or more SMT-LIB standards.

As an example, a resource element of a permission statement that grants or denies (depending on the effect element of the permission statement) access to a resources may be expressed as a propositional logic with the following constraints:

(assert (=policy.resource (or (and (="storage" resourceService) (=" " resourceAccount) (str.prefixof "foo/" resourceResource)) (and (="storage" resourceService) (="user" resourceAccount) (str.prefixof "bar/" resourceResource)

In other words, the resource element above the dotted line in the diagram 1500 may be translated to a propositional logic having a constraint that is satisfied when the resource has a "storage" service namespace, a blank resource account, and the resource beings with "fool" or the resource has a "storage" service namespace, a "user" account, and the resource beings with "bar/" in some embodiments. The effect, action, resource, and principal constraints may be in accordance with those described in connection with FIGS. 13-16. The constraints may also differ depending on what elements are included in the permission statement. For example, if a permission statement includes a condition, the constraint may further include that the condition be satisfied for the constraint to be satisfied. In some embodiments, at least one of the effect, action, resource, and principal elements is a required element of the permission statement such that a valid policy statement must have at least one of the effect, action, resource, and principal elements.

Figure 16:
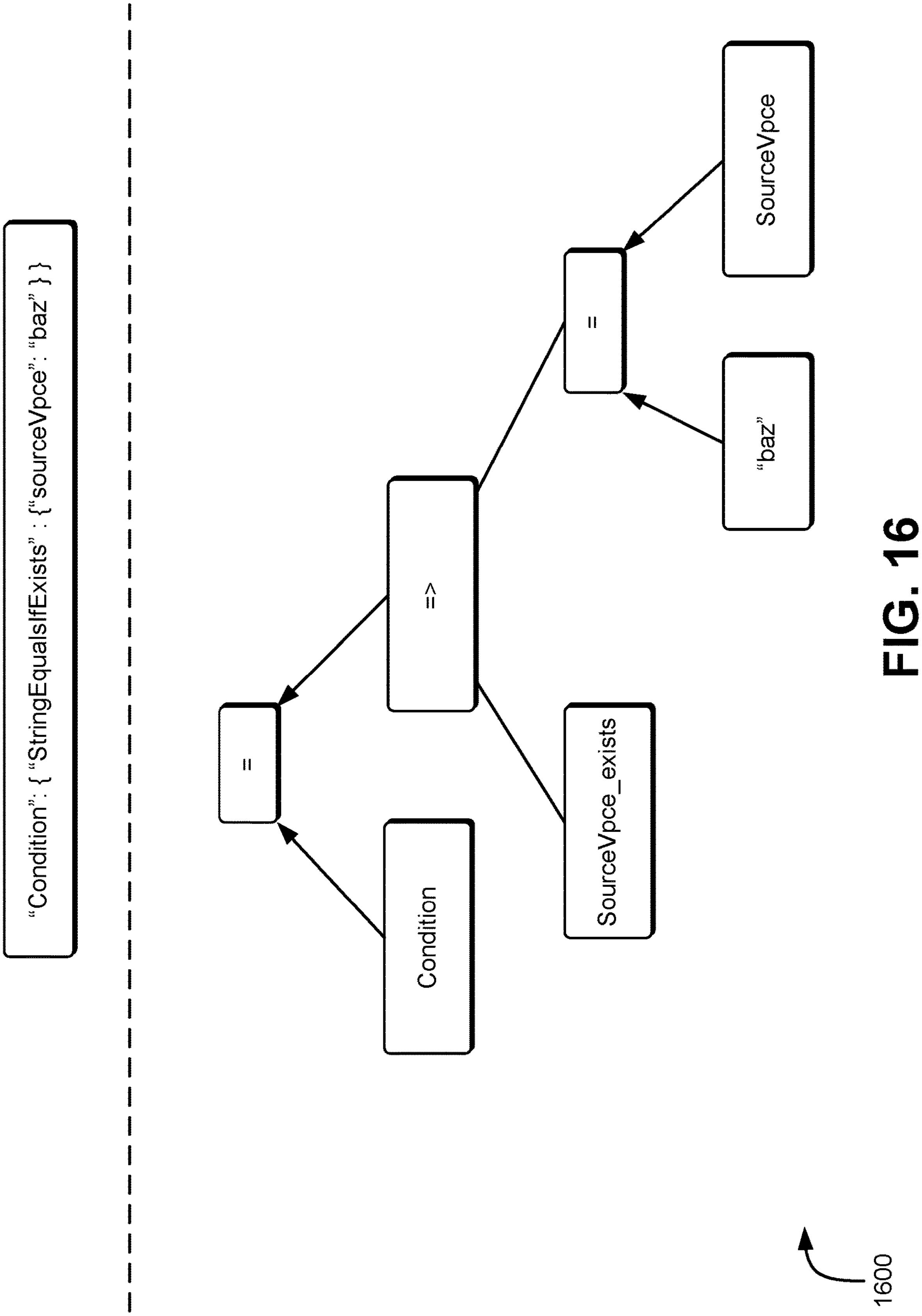
FIG. 16 illustrates a diagram in which propositional logic is used as part of determining satisfiability of a propositional logic formula.

FIG. 16 shows an illustrative example of a diagram 1600 where an element (e.g., as part of a policy) is translated to a propositional logic. The translation may be performed by any suitable component, such as propositional logic translators discussed in connection with FIG. 16. The diagram 1600 illustrates an example where a JSON element (shown above the dotted line) is translated to a propositional logic (shown below the dotted line). The propositional logic may be expressed in accordance with the SMT language which may be in accordance with one or more SMT-LIB standards.

As an example, an effect element of a permission statement that allows access to some resources (e.g., specified elsewhere in the permission statement) may be expressed as a propositional logic with the following constraints:

(assert (=policy.condition (=>SourceVpce_exists|(="baz" Source Vpce))

In other words, the resource element above the dotted line in the diagram 1600 may be translated to a propositional logic having a constraint that is satisfied when the "source Vpce" condition key (e.g., a field that specifies the name of a source virtual PC instance) exists for a resource and has a value of "baz" on that resource. In some embodiments, an implication operator may be utilized as part of a constraint. In some embodiments, implication may be denoted by an operator such as "=>" shown in the diagram 1600 and may include a predicate that is evaluated if and only if the precondition is true. For example, consider the expression shown above the dotted line which reads in part:

StringEqualsIfExists": {"sourceVpc": "baz"}

This expression may be translated into a propositional logic constraint such that if and only if a precondition is true, that a predicate is evaluated. In the diagram 1600, the precondition may be that the "sourceVpce" condition key exists and the predicate may be that the value of "sourceVpce" condition key is equal to the string "baz" as described below the dotted line in the diagram 1600. For example, consider the case where the condition described in connection with FIG. 16 is included in a permission statement that applies to the resources described in connection with FIG. 15. In such cases, there may be some resources and/or types of resources in "fool" and "bar/" that have the "sourceVpce" condition key and other resources and/or types of resources that do not have the condition key. In the cases where the resources or types of resources do not have the "sourceVpce" condition key, the predicate is not evaluated (or may be semantically treated as if the predicate was met). In some embodiments, if the "sourceVpce" field does not exist for a resource, the condition is not evaluated for that resource. The effect, action, resource, and principal constraints may be in accordance with those described in connection with FIGS. 13-16. The constraints may also differ depending on what elements are included in the permission statement. For example, if a permission statement includes a condition, the constraint may further include that the condition be satisfied for the constraint to be satisfied. In some embodiments, at least one of the effect, action, resource, and principal elements is a required element of the permission statement such that a valid policy statement must have at least one of the effect, action, resource, and principal elements.

Figure 17:
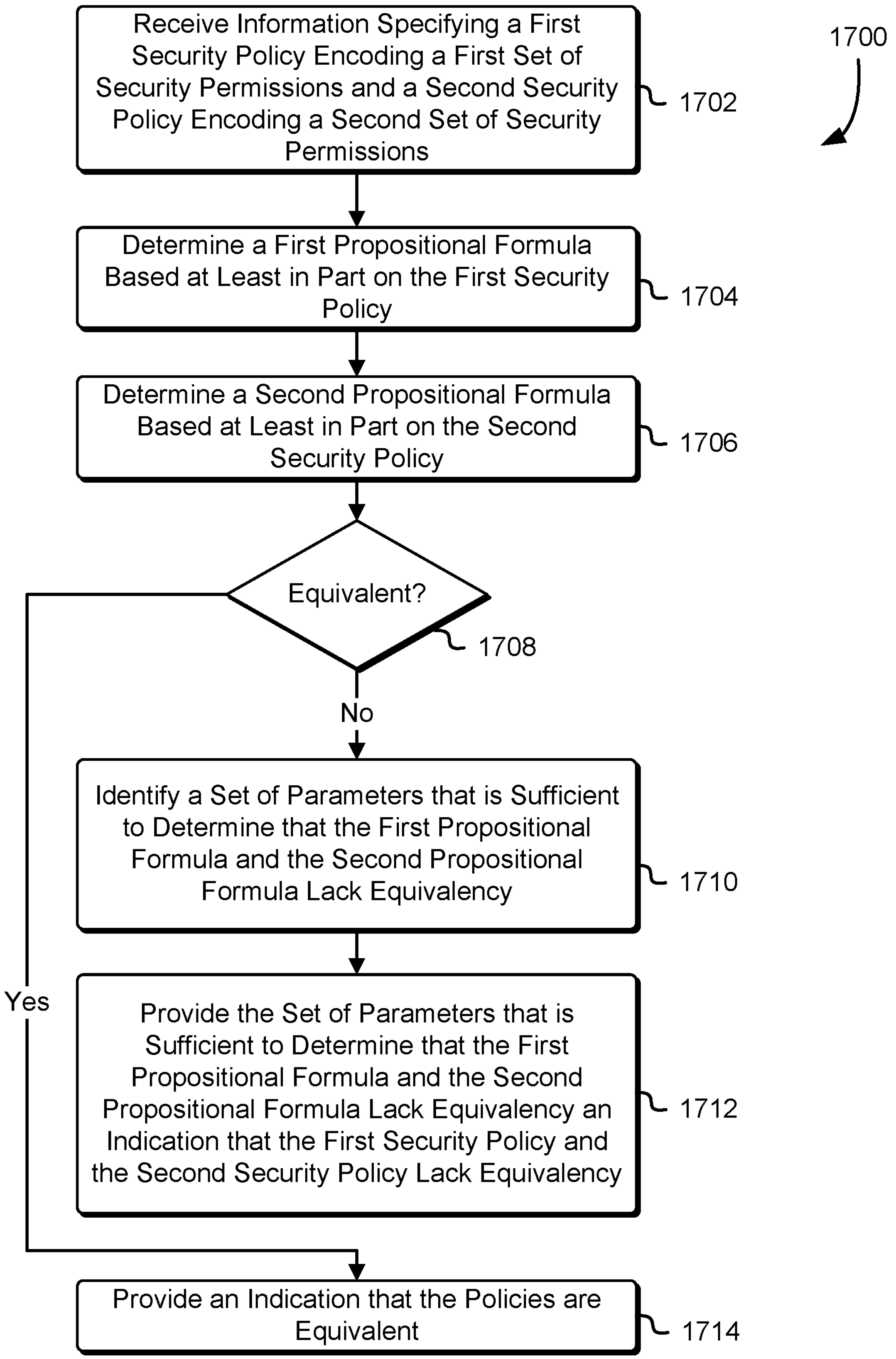
FIG. 17 shows a diagram illustrating a process for determining the equivalency of two or more security policies.

FIG. 17 shows an illustrative example of a process 1700 for determining the equivalency of two or more security policies. Generally, the process 1700 may be performed by any suitable system such as a policy analyzer service described elsewhere in this disclosure, such as those described in connection with FIG. 6. The process may be implemented using hardware, software, or a combination thereof. In an embodiment, the process 1700 includes receiving 1702 information specifying a first security policy and a second security policy. In some embodiments, the system receives the information as part of an interface, such as a web API request. In some embodiments, the security policies respectively encode a set of security permissions, which may be expressed in a language independent format such as JSON. The security permissions may be in accordance with those discussed elsewhere, such as in connection with FIG. 7. In some embodiments, the information specifying either or both policies may be specified directly (e.g., encoded as part of a data payload of a request) or indirectly (e.g., a reference to a policy is received by the system such that the reference may be used to obtain the policy, such as from a policy management service).

The system may determine 1704 a first propositional logic expression based at least in part on the first security policy. The determination may furthermore be made based on the first set of security permissions that is associated with the first security policy. The determination may be made in accordance with various embodiments described elsewhere in this disclosure. For example, the system may use a parser to obtain the first set of security permissions from the first security policy using a parse and may translate the first set of security permissions to a set of constraints in propositional logic, such as in the manner described above in connection with FIGS. 6-16. In some embodiments, the system translates a security policy expressed in JSON to a propositional logic expression (e.g., including one or more constraints) described in accordance with a SMT-LIB standard such as the SMT-LIB 2.0 standard.

The system may determine 1706 a second propositional logic expression in the same or substantially similar manner as described above in connection with determining 1704 the first propositional logic expression. However, in some embodiments, the steps may differ. For example, in some cases, the system may receive the first security policy directly in the request (e.g., the data encoding the policy may be included in the request) whereas the second security policy is indirectly referenced in the request (e.g., the request is a request to determine whether the first security policy complies with a standard security policy). In such an embodiment, the system may obtain the second security policy using the information included in the request that specifies the second security policy and then obtain the second propositional logic expression using the obtained second security policy. Techniques such as those described in connection with FIGS. 6-16 may be utilized.

The system may determine whether 1708 the first propositional logic expression and the second propositional logic expression are equivalent. Two policies may be said to be equivalent if the security permissions from the first policy and the second policy apply in the same manner to all actions, resources, and principals—in other words, for any given set of actions, resources, and principals, that the first policy and the second policy will both either deny access (either explicitly based on a denial statement or implicitly based on the lack of a permission granting access) or both will grant access—it will not be the case that one policy grants access and the other denies access. In the case that one policy is determined to be more permissive than another policy, it will be the case that one policy grants access under a set of parameters where the other policy denies access.

A satisfiability engine may be used to analyze the permissiveness of two or more propositional logic expressions, which includes determining whether two propositional logic expressions are equivalent. The satisfiability engine may be used to verify whether the propositional logic constraints (e.g., those obtained from the first and second propositional logic expressions and those generated by the satisfiability engine) are equivalent. In some embodiments, determining whether two or more propositional logic expressions are equivalent may be implemented at least in part using a SMT solver such as Z3. More generally, techniques described herein for determining the permissiveness, relative permissiveness, and/or equivalency of propositional logic expressions and propositional logic constraints may be used in connection with determining whether 1208 the first propositional logic expression and the second propositional logic expression are equivalent.

In some embodiments, the process 1700 may include performing one or more translations so that the security policies are mapped to propositional logic expressions in a particular format recognized by a SMT solver. For example, if a Z3 solver is used in connection with determining equivalency, then the security policies may be mapped to a format in accordance with a SMT-LIB standard language such as the STM-LIB 2.0 standard.

If the system determines that the first propositional logic expression and the second propositional logic expression are equivalent, then the system may provide 1714 an indication that the policies are equivalent. In some embodiments, the indication may be encoded in response to a web API request.

However, if the system determines that the first propositional logic expression and the second propositional logic expression are not equivalent, then the system may identify 1710 a set of parameters that is sufficient to determine that the first propositional logic expression and the second propositional logic expression lack equivalency. The set of parameters may encode one or more resources, one or more principals, one or more actions, or some combination thereof. In some embodiments, the set of parameters may be used to demonstrate that the first security policy corresponding to the first propositional logic and the second security policy corresponding to the second propositional logic are not equivalent because the result of evaluating the first security policy using the set of parameters—in other words, whether the result is a grant of access or a denial of access—is different from the result of evaluating the second security policy using the same set of parameters. Said differently, for a particular set of parameters, it may be the case that the first security policy grants access based on those parameters and the second security policy denies access based on those same parameters, or vice versa. In some embodiments, the system may identify 1710 the set of parameters as part of determining whether 1708 the propositional logic expressions are equivalent. In some cases, the system may provide 1712 the set of parameters as part of a web API response as an indication that the security policies are not equivalent. In some embodiments, the set of parameters may not be provided, but instead, an indication (e.g., a return code) may indicate whether the policies are equivalent. For example, a Boolean value may be returned such that TRUE is returned if the security policies are equivalent and FALSE is returned if they are not equivalent. Alternatively, an integer value may be returned such that 0 is returned if the security policies are equivalent, −1 is returned if the first security policy is more permissive than the second security policy, and 1 is returned if the second security policy is more permissive than the first security policy.

The order of various steps shown in the process 1700 are merely illustrative, and it may be the case that the determining 1706 of the second propositional logic expression may occur either before and/or in parallel with the determining 1704 of the first propositional logic expression. In fact, the ordering may even be nondeterministic in some embodiments. For example, the determinations 1704 and 1706 may be farmed out to separate compute instances of a pool of compute instances which may be run in parallel and may have different computational performance characteristics.

Figure 18:
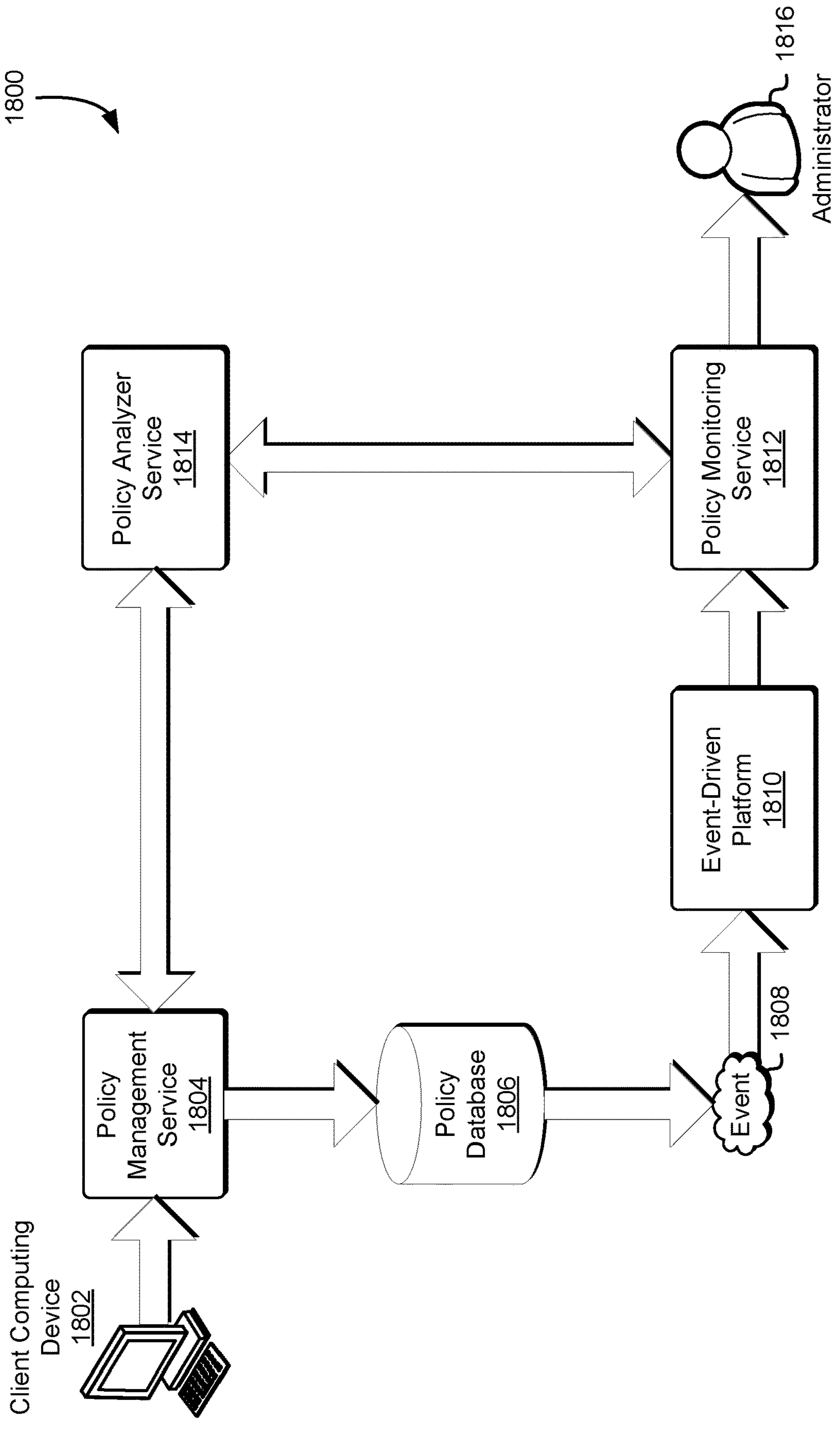
FIG. 18 illustrates an environment in which an event-driven platform is utilized in connection with analyzing security policies being applied to a system.

FIG. 18 is an illustrative example of an environment 1800 in which various embodiments of the present disclosure can be practiced. In an embodiment, the environment 1800 includes: a client computing device 1802; a policy management service 1804; a policy repository 1806; an event-driven platform 1810; a policy monitoring service 1812; and a policy analyzer service 1814. The environment 1800 illustrates an example in which a client may apply a policy which generates a corresponding event 1808 and the event 1808 in turn triggers the event-driven platform 1810 to analyze one or more policies. In some cases, such as where the client computer system applies or attempts to apply a security policy that does not conform to a set of rules, an administrator 1816 of a network may be notified, perhaps in addition to other actions such as refusing fulfill a request to apply the noncompliant policy, provide a warning to the client that a policy is noncompliant, or perform additional auditing steps.

In some embodiments, a computing resource service provider, such as those described in connection with FIG. 9, is configured so that clients of the computing resource service provider can apply security policies within an environment. In some embodiments, a client uses a command line interface to set a security policy using a web API supported by the policy management service 1804. The policy management service 1804 receives a web API request to apply a security policy and may perform one or more authorization and authentication procedures as part of fulfilling the request. The policy may be applied and stored in a policy repository 1806 where it can be retrieved for later use. In some embodiments, applying a policy and/or storing an applied policy to a policy repository 1806 generates a corresponding logging entry via a logging system. The logging system may be used to log some or all activities across a network, such as record information regarding web API requests made to a computing resource service provider.

An event 1808 may be generated in response to the application of a security policy or one or more downstream actions resulting from applying a security policy. For example, the event 1808 may be triggered by a web API call to apply a security policy, storing the policy in the policy repository, logging the application of the security policy and/or the storing of the policy to a policy repository, or some combination thereof.

An event-driven platform 1810 may determine when an event 1808 occurs and perform custom logic in response to the event being triggered. An event trigger may, for example, be detected when a policy is applied or may be determined at a later point in time, such as in cases where an asynchronous process (e.g., run daily) processes logging events and detects that a security policy was applied. The event-driven platform 1808 may be implemented using software, hardware, or some combination thereof. In some embodiments, distributed computing resources may provision and load custom logic/code in response to the event, run the code, and then unload the code and de-provision the computing resource. The event-drive platform 1810 may be a component of a computing resource service provider or may be a separate component.

An event-driven platform 1810 may be implemented using an event-driven architecture. When a specific event such as a web API request to apply a security policy occurs, the event-driven platform 1810 may be notified (e.g., by the authentication service) of that event and the event-driven platform may further receive additional information regarding the request, which may be obtained separately (e.g. from the policy management service that the request is directed towards). The event-drive platform 1810 may determine how to handle the event, which may be handled in part by custom code or logic that is selected based on information obtained about the request—for example, the custom logic may differ for security policies based on the type of resource that the security policy applies to. In some embodiments, the event-drive platform 1810 may subscribe to notification messages from the authentication service for events and the authentication service may invoke callback function (such as a lambda expression) in response to an event that the event-drive platform subscribes to receive notifications for.

The event-driven platform 1810 may receive the events 1808 and determine, either internally (e.g., using a component of the event-driven platform) or externally (e.g., by delegating to another service) how to handle the events. As an example, the event-driven platform may include rules regarding which, among a list of custom logics, should be invoked based on the specific type security policy that is being applied or other metadata associated with the security policy being applied. A mapping of security policy types to custom logics may exist. For example, a first custom logic may be invoked based on the security policy applying to a computing resource having a first service namespace and a second custom logic may be invoked based on the security policy applying to a computing resource having a second service namespace.

A policy monitoring service 1812 may be invoked by the event-driven platform 1810. In some embodiments, the event-driven platform 1810 invokes the policy monitoring service 1812 and provides context information regarding the security policy that triggered the event 1808, thereby allowing the policy monitoring service 1812 to perform various custom logics, for example, based on various parameters of the applied policy. For example, a computing resource service provider may support several services for various types of computing resources, and the set of best practice rules may differ based on the type of computing resource the security policy applies to. A policy monitoring service 1812 may determine a reference policy for a resource type and utilize a policy analyzer service 1814 to determine whether the applied policy is more permissive than the reference policy. The policy analyzer service 1814 may be in accordance with those described elsewhere in this disclosure, such as in connection with FIGS. 6-17.

If the policy analyzer service 1814 indicates that the applied policy is more permissive than the applicable reference policy, then the policy monitoring service 1812 may perform various mitigating procedures. For example, the policy management service 1804 may be notified that the web API request to apply the security policy is more permissive than a reference policy and instruct the policy management service 1804 to deny the request (i.e., refuse to fulfill the request). In some cases, fulfillment of the request to apply the security policy may be contingent upon the policy management service 1804 receiving an indication from the policy monitoring service that the request should be permitted. The requestor (e.g., the client) may be notified that the security policy of the request is too permissive. In some cases, the requestor is granted the opportunity to revise the security policy or apply it. Applying a security policy that is too permissive may result in a system administrator 1816 being notified, the security policy being logged to a separate system to be audited at a later time, and various other mitigations. Of course, other entities within an organization may be informed, such as a network security team and the like.

Figure 19:
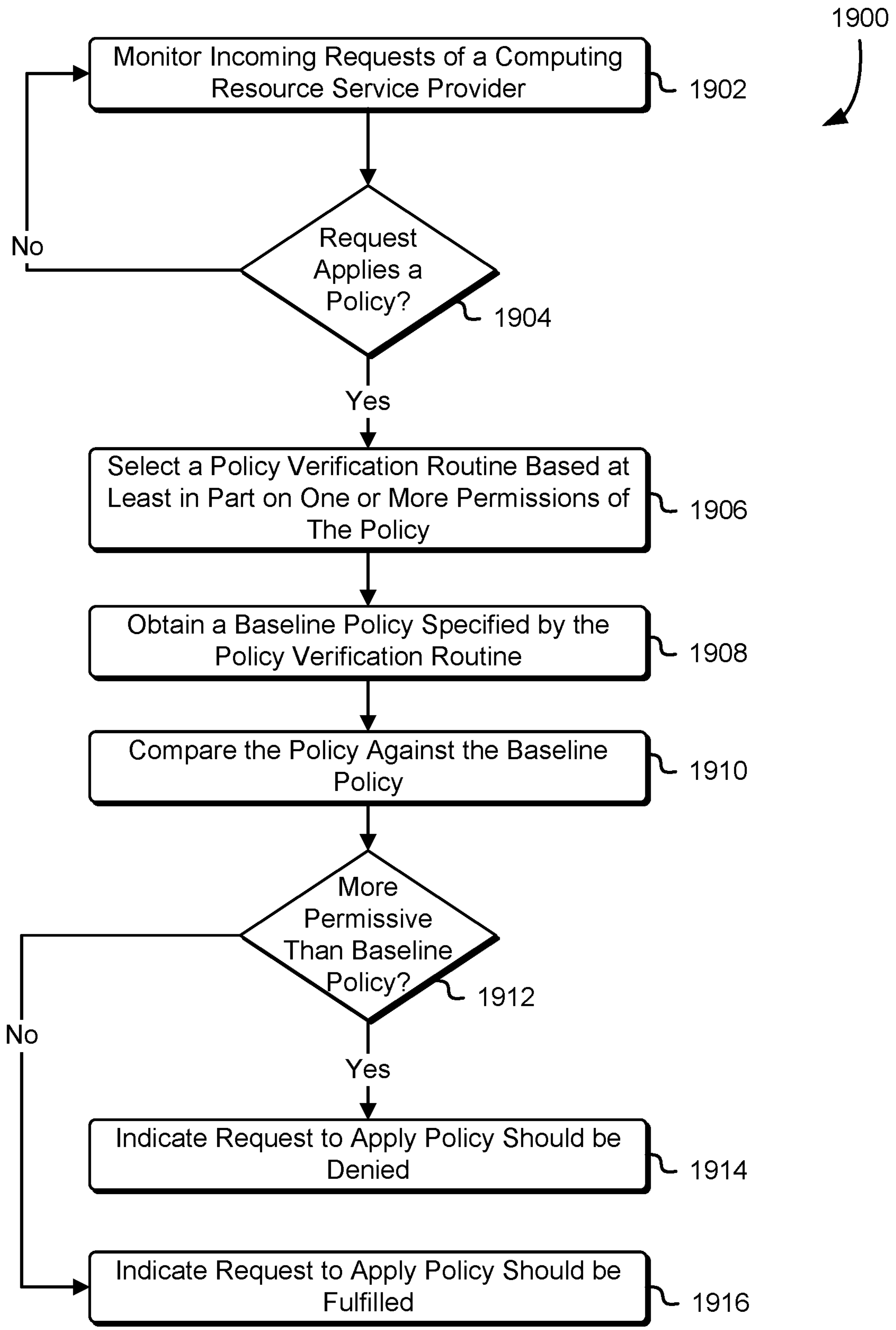
FIG. 19 shows a diagram illustrating a process for monitoring policies being applied to a system.

FIG. 19 shows an illustrative example of a process 1900 for monitoring policies being applied to a system. Generally, the process 1900 may be performed by any suitable system such as an event-driven platform described elsewhere in this disclosure, such as those described in connection with FIG. 18. The process may be implemented using hardware, software, or a combination thereof. In an embodiment, the process 1900 includes a monitoring routine. As an example, the system may monitor 1902 incoming requests of a computing resource service provider. A monitoring agent may be utilized to parse incoming traffic for requests (e.g., web API calls) and determine whether 1904 a request applies a policy. It should be further noted that in this context, the monitoring 1902 step may be an active monitoring process (such as in the case where a monitoring agent actively polls a logging system to determine whether requests have been received) or a passive monitoring process (such as in the case where a service frontend invokes the monitoring agent upon determining that an incoming request applies a policy).

More generally, a monitoring agent can be utilized to track the incoming requests themselves or downstream effects caused by the requests. For example, in some cases, web API requests to a computing resource service provider are parsed at a service frontend and distributed among several services of a computing resource service provider. In some cases, the monitoring agent may detect when a request is forwarded to a policy management service and parse those requests to determine whether a request applies a policy. As another example, some or all requests may be recorded in a logging system as the requests are received. The logging system may record information about the requests, such as the specific web API called, the parameters of the API call, and more. A monitoring agent may read the logs generated by requests to determine when a request applies a policy. Such a system may be performed either contemporaneous to the logging of the request or at a later point in time—for example, a monitoring agent may audit the logs once a day to check whether there are any policies in place which may violate rules imposed on the system.

If the system determines that a request does not apply a policy, then the system may continue to monitor requests. Alternatively, if the system determines that a request applies a security policy, the system may select 1906 a policy verification routine based at least in part on one or more security permissions of the security policy. For example, the policy verification routine may be selected from a list of policy verification routines based on the principal element of a security permission—a policy verification routine associated with guest or anonymous users may limit the maximally permissive set of privileges that a guest or anonymous user may receive. As a second example, a policy verification routine may be chosen based on a service namespace encoded in a resource element of a security permission—the maximally permissive set of privileges for a particular resource type as specified in the service namespace may vary from service to service.

Once a policy verification routine has been selected, the policy verification routine may be invoked. An event-driven platform may perform at least some of the steps in connection with selecting a policy verification routine and invoking the selected policy verification routine. One or more baseline policies may be obtained 1908 in connection with the selected policy verification routine. A system may have multiple baseline policies, and selection of one or more baseline policies may be based on the policy verification routine and the permissions attached to the security policy that triggered the policy verification routine to be invoked.

The one or more baseline policies obtained by the policy verification routine may be compared 1910 against the security policy being applied in the request. A reference policy may be selected based on various factors such as the input parameters of the web API request applying the policies. The baseline policies may be best practices policies that are determined to be a set of permissions which are should not be allowed. For example, a baseline practices policy may be that resources of a storage service should not be world-writeable (e.g., any principal, even a guest user or anonymous user can write to the container).

The system may determine whether 1912 the policy being applied by the request is more permissive than the reference policy. A policy analyzer service, such as those described in connection with FIGS. 6-9, may be utilized to compare the security policy being applied in the request against the reference policy. More generally, a constraint solver such as a SMT-based constraint solver (e.g., Z3) may be utilized to determine whether the security policy being applied in the request is more permissive or equally as permissive as a reference policy.

In some embodiments, determining whether the policy being applied by the request is more permissive than the reference policy may be performed using a fuzzer. A fuzzer may be a software module that includes executable code configurable to test software components by determining a set of inputs to an interface and verify that the outputs match expected values. For example, a fuzzer could be utilized to test the arithmetic operations of a processor by selecting a set of inputs from a lookup table and performing a set of operations (e.g., division) and verify that the results are correct based on an output lookup table. A fuzzer may select a set of parameters (e.g., a principal, an action, and a computing resource) and determine whether a request corresponding to the set of parameters would be fulfilled under the security policy of the request and the reference policy. If one policy would fulfill the request and the other would deny the request, then the relative permissiveness of the two policies may be determined (e.g., that one policy is more permissive than the other, the two policies are incomparable, and so on). In some embodiments, the fuzzer may have a predetermined list of parameters that it tests. In some embodiments, the fuzzer may randomly select sets of parameters.

If the system determines that the security policy of the request is less permissive than the reference policy, such information may be indicated. In some embodiments, when a policy management service receives a request to set a security policy, the security policy of the request may be analyzed in the manner described above to determine whether the security policy complies with applicable baseline policies. In some cases, fulfillment of the request (e.g., applying the security policy to a policy database) is contingent upon receiving an indication that the security policy being applied in the request is in compliance with any and all applicable policy verification routines. Thus, when a request to apply a security policy is received, the policy management service may wait for a response from the policy verification routine before fulfilling the request and the policy verification routine may provide an indication 1916 that the request should be fulfilled. However, this need not be the case—in some cases, the policy management service sets security policies without waiting for an indication from the policy verification routine.

Alternatively, if the system determines that the security policy of the request is more permissive than the reference policy the system may indicate 1914 the request to apply the policy is denied or should be denied and such information may be indicated. In some embodiments, a client may use a GUI to submit a request to apply a security policy. In response to detecting that the security policy of the request is more permissive than a reference policy, a failure code may be returned to the client, which may be presented in the GUI, for example, as a pop-up window. If a client uses a command line interface, the failure code may be presented in-line as text.

In some embodiments, the system may also provide a set of parameters that is sufficient to determine that the security policy of the request and the reference policy lack equivalency. A policy analyzer service such as those described in connection with FIG. 6-9 and utilizing techniques described elsewhere in this disclosure, such as in connection with FIG. 17.

If the security policy of the request and the reference policy are equivalent, then the system may perform various suitable actions. In some embodiments, it may be treated in the same manner as if the system determined that the security policy was more permissive than the reference policy. Alternatively, it may be treated in the same manner as if the system determined that the security policy was less permissive than the reference policy. How the system handles the case when the security policies are equivalent may be a configurable setting.

In some embodiments, there may be multiple baseline policies that the security policy is compared against. In such cases, the security policy being applied by the request may be compared against each reference policy individually. These comparisons may be made sequentially, as well as in parallel with each other.

In some embodiments, techniques may utilize one or more of the following methods, systems, and/or non-transitory computer-readable storage mediums:

Clause 1. A computer-implemented method, comprising:
- receiving, via an interface, information specifying:
- a first security policy encoding a first set of security permissions;
- a second security policy encoding a second set of security permissions;
- determining a first propositional logic expression based at least in part on the first set of security permissions;
- determining a second propositional logic expression based at least in part on the second set of security permissions;
- identifying a set of parameters that is sufficient to determine the first propositional logic and the second propositional logic lack equivalency such that applying the first security policy to the set of parameters results in a denial of access to a computing resource associated to the set of parameters and applying the second security policy to the set of parameters results in a grant of access to the computing resource; and
- providing, via the interface:
  - an indication that the first security policy and the second security policy lack equivalency; and
  - the set of parameters.

Clause 2. The computer-implemented method of clause 1, wherein determining the first propositional logic and the second propositional logic lack equivalency comprises utilizing a satisfiability modulo theories (SMT) solver to determine whether constraints generated based at least in part from the first propositional logic and the second propositional logic are satisfiable.

Clause 3. The computer-implemented method of clause 2, wherein the constraints generated based at least in part from the first propositional logic and the second propositional logic are in accordance with a SMT-LIB Standard.

Clause 4. The computer-implemented method of clause 1, wherein the indication that the first security policy and the second security policy lack equivalency includes an indication of whether the first security policy is more permissive than the second security policy.

Clause 5. A system, comprising:

one or more processors;

memory that stores computer-executable instructions that, if executed, cause the system to:

determine a first propositional logic based at least in part on a first set of security permissions;

determine a second propositional logic based at least in part on a second set of security permissions; and determine the first propositional logic and the second propositional logic lack equivalency using the first propositional logic and the second propositional logic; and provide an indication that the first set of security permissions and the second set of security permissions lack equivalency.

Clause 6. The system of clause 5, wherein the computer-executable instructions that determine the first propositional logic and the second propositional logic lack equivalency further comprise computer-executable instructions that, if executed, cause the system to utilize a satisfiability modulo theories (SMT) solver to determine whether constraints generated based at least in part from the first propositional logic and the second propositional logic are satisfiable.

Clause 7. The system of clause 5, wherein the first set of security permissions are included in a first policy and the second set of security permissions are included in a second policy.

Clause 8. The system of clause 6, wherein the constraints generated based at least in part from the first propositional logic and the second propositional logic are in accordance with a CVC format or DIMACS format.

Clause 9. The system of clause 5, wherein the computer-executable instructions that determine the propositional logic and the second propositional logic lack equivalency further comprise computer executable instructions that, if executed, cause the system to:

generate a first set of constraints corresponding to access grants of the first set of security permissions; and generate a second set of constraints corresponds to access denials of the first set of security permissions.

Clause 10. The system of clause 9, wherein the computer-executable instructions that determine the propositional logic and the second propositional logic lack equivalency further comprise computer executable instructions that, if executed, cause the system to generate a third set of constraints corresponding to access neutral constrains of the first set of security permissions.

Clause 11. The system of clause 5, wherein the second set of security permissions is obtained from the user selecting the second set of security permissions from a predetermined plurality of sets of security permissions.

Clause 12. The system of clause 5, wherein the computer-executable instructions that determine that the first propositional logic and the second propositional logic lack equivalency further comprise computer executable instructions that, if executed, cause the system to determine that the first propositional logic and the second propositional logic are incomparable.

Clause 13. A non-transitory computer-readable storage medium having stored thereon executable instructions that, as a result of being executed by one or more processors of a computer system, cause the computer system to at least:

identify whether there exists a security permission associated with either a first set of security permissions or a second set of security permissions that is sufficient to determine a first propositional logic determined from the first set of security permissions and a second propositional logic determined from the second set of security permissions lack equivalency; and provide an indication that the first set of security permissions and the second set of security permissions lack equivalency.

Clause 14. The non-transitory computer-readable storage medium of clause 13, wherein the executable instructions that, as a result of being executed, cause the computer system to identify whether there exists the security permission further comprise executable instructions that use a satisfiability modulo theories (SMT) solver.

Clause 15. The non-transitory computer-readable storage medium of clause 13, wherein the executable instructions that, as a result of being execute, cause the computer system to identify whether there exists the security permission that is sufficient to determine whether the first propositional logic and the second propositional logic lack equivalency further comprise executable instructions that use a satisfiability (SAT) solver.

Clause 16. The non-transitory computer-readable storage medium of clause 15, wherein the SAT solver is a (binary decision diagrams) BDD SAT solver.

Clause 17. The non-transitory computer-readable storage medium of clause 13, wherein the first set of security permissions identifies at least:

a principal;

an action;

a computing resource; and either a grant effect or a deny effect.

Clause 18. The non-transitory computer-readable storage medium of clause 17, wherein the first set of security permissions further identifies at least one condition predicate.

Clause 19. The non-transitory computer-readable storage medium of clause 13, wherein at least one of the first set of security permissions and the second set of security permissions is obtained from a policy repository comprising a plurality of applied security policies, the applied security policies comprising sets of security permissions.

Clause 20. The non-transitory computer-readable storage medium of clause 13, wherein the executable instructions that, as a result of being executed by one or more processors of a computer system, further cause the computer system to at least:

identify the security permission that is sufficient to determine the first propositional logic and the second propositional logic lack equivalency; and provide the identified security permission as part of a response to a request to determine equivalency of the first propositional logic and the second propositional logic.

In some embodiments, techniques may utilize one or more of the following methods, systems, and/or non-transitory computer-readable storage mediums:

Clause 1. A computer-implemented method, comprising:

accessing a record from a log of application programming interface calls, wherein the record corresponds to an application programming interface call of the application programming interface calls;

determining, based at least in part on the record, that the application programming interface call applies a first policy usable to grant or deny access to one or more computing resources;

invoking a policy verification routine, wherein the policy verification routine comprises:

selecting a reference policy from a plurality of security policies based at least in part on the first policy;

determining a first propositional logic expression based at least in part on a first set of security permissions associated with the first policy;

determining a second propositional logic expression based at least in part on a second set of security permissions associated with the reference policy; and determining whether the first propositional logic expression is more permissive than the second propositional logic expression; and in response to determining the first propositional logic expression is more permissive than the second propositional logic expression, performing a mitigation routine that modifies or revokes the first policy.

Clause 2. The computer-implemented method of clause 1, wherein a satisfiability modulo theories (SMT) solver is utilized as part of determining whether the first propositional logic expression is more permissive than the second propositional logic expression.

Clause 3. The computer-implemented method of clause 1, wherein the mitigation routine comprises denying access to at least one computing resource that the first policy enables access to.

Clause 4. The computer-implemented method of clause 1, wherein determining that the first propositional logic expression is more permissive than the second propositional logic expression comprises identifying a set of parameters wherein:

the set of parameters identifies a principal, an action, and a computing resource;

application of the first policy to the set of parameters results in access to the computing resource being granted; and application of the reference policy to the set of parameters results in access to the computing resource being denied.

Clause 5. A system, comprising:

one or more processors; and memory that stores computer-executable instructions that, if executed, cause the system to:

determine, based at least in part on a plurality of received application programming interface calls, that an application programming interface call of the plurality applies a first policy usable to grant or deny access to one or more computing resources;

invoke a policy verification routine, wherein the instructions that cause the system to invoke the policy verification routine, if executed, cause the system to:

select a reference policy from a plurality of predefined security policies;

determine a set of constraints based at least in part on a first mapping of the first policy to a first expression comprising propositional logic and a second mapping of the reference policy to a second expression comprising propositional logic;

determine whether the first policy is more permissive than the reference policy based at least in part on whether the set of constraints is satisfiable; and transmit information based at least in part on having determined whether the first policy is more permissive than the reference policy.

Clause 6. The system of clause 5, wherein the first expression further comprises first-order logic.

Clause 7. The system of clause 5, wherein the instructions that cause the system to determine whether the first policy is more permissive than the reference policy, if executed, cause the system to use a satisfiability modulo theories (SMT) solver to evaluate whether the set of constraints is satisfiable.

Clause 8. The system of clause 7, wherein a Z3 solver is the SMT solver.

Clause 9. The system of clause 5, wherein the computer-executable instructions that, if executed, further cause the system to:

deny access to all computing resources that the first policy enables access to; and provide an indication to an entity associated with the application programming interface call that applied the first policy that the first policy is more permissive than the second policy.

Clause 10. The system of clause 5, wherein the policy verification routine further comprises providing an indication of a set of parameters, wherein:

the set of parameters comprises:

a principal;

an action;

a computing resource; and a grant effect or a deny effect;

application of the first policy to the set of parameters grants access to the computing resource; and application of the reference policy to the set of parameters denies access to the computing resource.

Clause 11. The system of clause 10, wherein the set of parameters further comprises at least one condition predicate that defines whether a corresponding policy is in effect.

Clause 12. The system of clause 5, wherein the reference policy is selected based at least in part on a service namespace associated with a computing resource encoded in the application programming interface call.

Clause 13. A non-transitory computer-readable storage medium having stored thereon executable instructions that, as a result of being executed by one or more processors of a computer system, cause the computer system to at least:

monitor a plurality of requests, at least some requests of the plurality applying security policies that grant or deny access to computing resources of a computing resource service provider;

identify a request of the plurality applies a first policy;

invoke a policy verification routine, wherein the policy verification routine causes the computer system to at least:

determine a set of constraints based at least in part on a first mapping of the first policy to a first expression comprising propositional logic and a second mapping of the reference policy to a second expression comprising propositional logic;

determine whether the first policy is more permissive than the reference policy by evaluating whether the set of constraints is satisfiable; and in response to determining the first policy is more permissive than the reference policy, performing a mitigation routine.

Clause 14. The non-transitory computer-readable storage medium of clause 13, wherein the second expression comprises first-order logic.

Clause 15. The non-transitory computer-readable storage medium of clause 13, wherein the executable instructions that determine whether the first policy is more permissive than the reference policy, as a result of being executed, cause the computer system to use a satisfiability modulo theories (SMT) solver to evaluate whether the set of constraints is satisfiable.

Clause 16. The non-transitory computer-readable storage medium of clause 15, wherein the constraints are encoded in a format in accordance with in accordance with a SMT-LIB Standard.

Clause 17. The non-transitory computer-readable storage medium of clause 13, wherein the first policy is encoded in a JavaScript Object Notation (JSON) format.

Clause 18. The non-transitory computer-readable storage medium of clause 13, wherein the second policy is obtained from a predetermined plurality of security policies.

Clause 19. The non-transitory computer-readable storage medium of clause 13, wherein the executable instructions that, as a result of being executed by the one or more processors of the computer system, further cause the computer system to perform the mitigation routine in response to determining the first policy and the reference policy are equivalent.

Clause 20. The non-transitory computer-readable storage medium of clause 13, wherein the executable instructions that, as a result of being executed by the one or more processors of the computer system, further cause the computer system to perform the mitigation routine in response to determining the first policy and the reference policy are incomparable.

Figure 20:
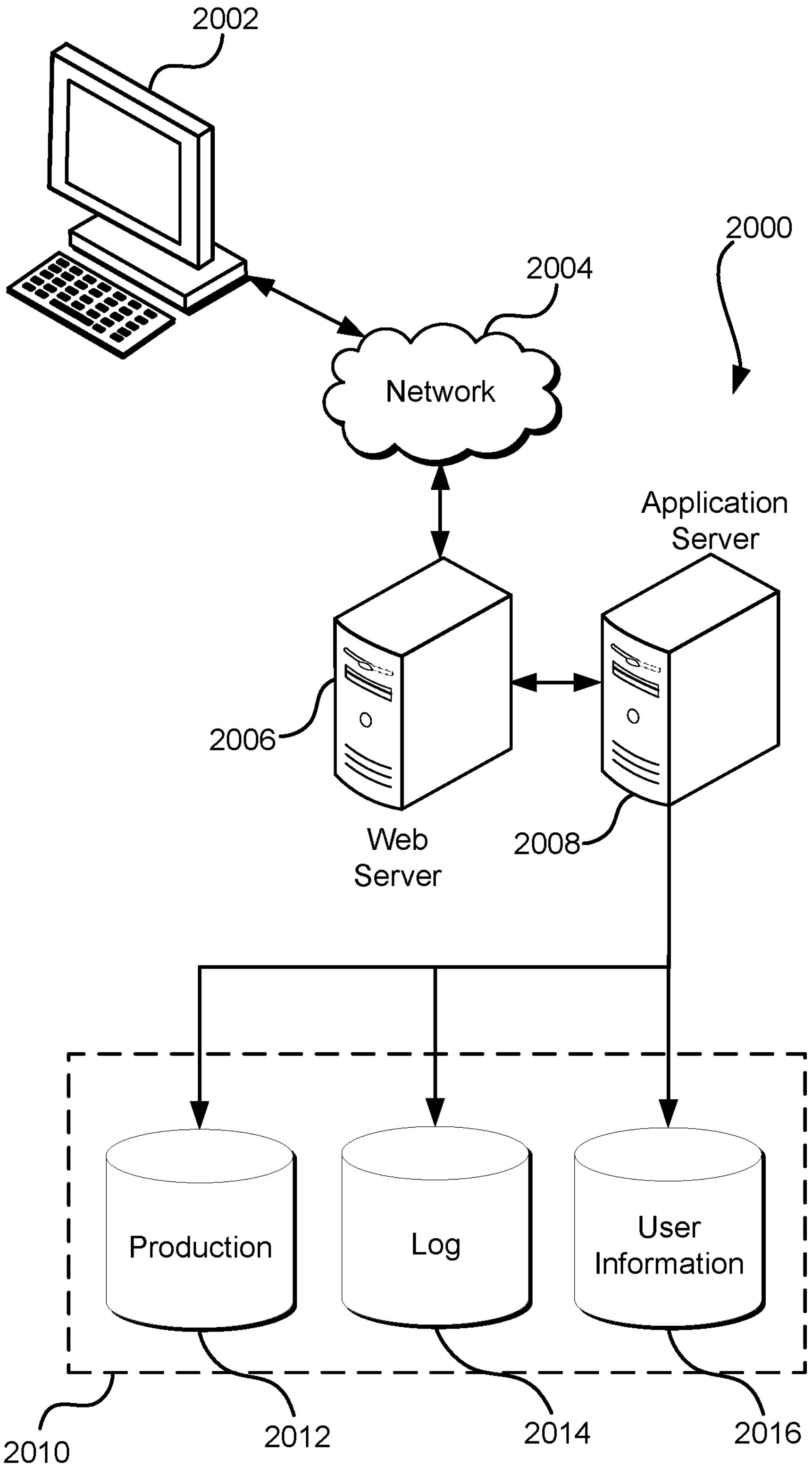
FIG. 20 illustrates a system in which various embodiments can be implemented.

FIG. 20 illustrates aspects of an example system 2000 for implementing aspects in accordance with an embodiment. As will be appreciated, although a web-based system is used for purposes of explanation, different systems may be used, as appropriate, to implement various embodiments. In an embodiment, the system includes an electronic client device 2002, which includes any appropriate device operable to send and/or receive requests, messages, or information over an appropriate network 2004 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 2006 for receiving requests and serving content in response thereto, although for other networks an alternative device serving a similar purpose could be used as would be apparent to one of ordinary skill in the art.

In an embodiment, the illustrative system includes at least one application server 2008 and a data store 2010 and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including, but not limited to, text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including, but not limited to, forms that are perceptible to the user audibly, visually and/or through other senses. The handling of all requests and responses, as well as the delivery of content between the client device 2002 and the application server 2008, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 2010, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 2012 and user information 2016, which are used to serve content for the production side. The data store also is shown to include a mechanism for storing log data 2014, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 2010.

The data store 2010, in an embodiment, is operable, through logic associated therewith, to receive instructions from the application server 2008 and obtain, update or otherwise process data in response thereto and the application server 2008 provides static, dynamic, or a combination of static and dynamic data in response to the received instructions. In an embodiment, dynamic data, such as data used in web logs (blogs), shopping applications, news services, and other such applications are generated by server-side structured languages as described herein or are provided by a content management system ("CMS") operating on, or under the control of, the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 2002. Continuing with example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 2000 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed (i.e., as a result of being executed) by a processor of the server, cause or otherwise allow the server to perform its intended functions.

The system 2000, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 20. Thus, the depiction of the system 2000 in FIG. 20 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that run one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C #or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context.

In addition, unless otherwise noted or contradicted by context, the term "plurality" indicates a state of being plural (e.g., "a plurality of items" indicates multiple items). The number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, a non-transitory computer-readable storage medium store instructions and a main CPU execute some of the instructions while a graphics processor unit executes other instructions. In an embodiment, different components of a computer system have separate processors and different processors execute different subsets of the instructions.

Accordingly, in an embodiment, computer systems are configured to implement one or more services that singly or collectively perform operations of processes described herein and such computer systems are configured with applicable hardware and/or software that enable the performance of the operations. Further, a computer system that implement an embodiment of the present disclosure is a single device and, in another embodiment, is a distributed computer systems comprising multiple devices that operate differently such that the distributed computer system performs the operations described herein and such that a single device does not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:

obtaining a first request including a value to access a computing resource;

obtaining one or more security policies usable to allow access to the computing resource;

comparing the value to a preset value associated with a security policy of the one or more security policies;

determining that the value matches the preset value associated with the security policy;

indicating that role assumption is allowed for a principal based on the value matching the preset value for the principal;

obtaining a second request for the principal to assume a role; and in response to the second request, granting access of the computing resource to the principal with the role in accordance with the role assumption.

2. The computer-implemented method of claim 1, wherein the value to access the computing resource includes one or more of:

a date value;

a value in binary format;

an IP address value; or a string value.

3. The computer-implemented method of claim 1, wherein the preset value is a literal value included within a condition to effectuate the security policy.

4. The computer-implemented method of claim 2, wherein indicating that role assumption is allowed comprises transmitting a message including a Boolean value indicating that the assumption of the role is allowed.

5. A system, comprising:

one or more processors; and memory that stores computer-executable instructions that, if executed, cause the one or more processors to:

obtain a first request including a value to access a computing resource;

obtain one or more security policies usable to allow access to the computing resource;

compare the value to a preset value associated with a security policy of the one or more security policies;

determine that the value matches the preset value associated with the security policy;

indicate that the role is allowed for assumption by the principal based on the value matching the preset value;

obtain a second request for the principal to assume a role;

and in response to the second request, grant access of the computing resource to the principal with the role to be assumed.

6. The system of claim 5, wherein the value to access the computing resource includes one or more of:

a date value;

a value in binary format;

an IP address value; or a string value.

7. The system of claim 5, wherein the preset value is a literal value included within a condition to effectuate the security policy.

8. The system of claim 5, wherein the security policy is encoded in a JSON format.

9. The system of claim 5, wherein the principal is user assigned to a specified role.

10. The system of claim 6, wherein the request is a web service application programming interface (API) request.

11. The system of claim 5, further comprising instructions to execute steps to:

perform an additional request, to a policy subsystem, for authorization to assume a second role;

obtain, as at least part of a response, a trust policy from the policy subsystem; and based on the obtained trust policy, determine whether the principal is authorized to assume the second role.

12. The system of claim 5, wherein providing access to the computing resource comprises authorizing fulfillment of the request for access to the computing resource.

13. A non-transitory computer-readable storage medium comprising executable instructions that, as a result of being executed by one or more processors of a computer system, cause the computer system to:

obtain a first request including a value to access a computing resource;

obtain one or more security policies usable to allow access to the computing resource;

compare the value to a preset value associated with a security policy of the one or more security policies;

determine that the value matches the preset value associated with the security policy;

indicate that role assumption is allowed for a principal based on the value matching the preset value for the principal;

obtain a second request to designate a role for the principal;

and responsive to the obtaining of the second request, grant access of the computing resource to the principal with the role.

14. The non-transitory computer-readable storage medium of claim 13, wherein the value to access the computing resource includes one or more of:

a date value;

a value in binary format;

an IP address value; or a string value.

15. The non-transitory computer-readable storage medium of claim 13, wherein the first request is a web service application programming interface (API) request.

16. The non-transitory computer-readable storage medium of claim 13, wherein the policy is encoded in a JSON format.

17. The non-transitory computer-readable storage medium of claim 13, wherein the preset value is a literal value included within a condition to effectuate the policy.

18. The non-transitory computer-readable storage medium of claim 13, wherein the principal is user assigned to a specified role.

19. The non-transitory computer-readable storage medium of claim 13, wherein the executable instructions include instructions that cause the computer system to:

determine that a set of roles assumable by the principal includes trust policies that allow assumption of the set of roles by the principal.

20. The non-transitory computer-readable storage medium of claim 19, wherein the trust policies are obtained from a policy subsystem.

* * * * *